(12) United States Patent
Omori et al.

(10) Patent No.: US 6,507,859 B1
(45) Date of Patent: Jan. 14, 2003

(54) SIGNAL PROCESSING METHOD

(75) Inventors: Shiro Omori, Kanagawa (JP); Kazuhiko Ueda, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/488,665

(22) Filed: Jan. 20, 2000

(30) Foreign Application Priority Data

Jan. 22, 1999 (JP) .......................................... 11-014761

(51) Int. Cl.⁷ .............................................. G06F 17/10
(52) U.S. Cl. ...................................................... 708/300
(58) Field of Search ................................ 708/300–323, 708/405

(56) References Cited

U.S. PATENT DOCUMENTS 4,152,649 A * 5/1979 Choquet ..................... 708/305
5,309,482 A * 5/1994 Wright ....................... 708/323
6,353,629 B1 * 3/2002 Pal ............................. 708/323

* cited by examiner

*Primary Examiner*—Tan V. Mai
(74) *Attorney, Agent, or Firm*—Sonnenschein, Nath & Rosenthal

(57) ABSTRACT

A signal processing method enabling reproduction of a broadband signal free of aliasing which transforms a plurality of discrete signals obtained by sampling an identical continuous signal using sampling phases different in a one-dimensional direction and containing a basic spectral component contained in the continuous signal and imaging components other than the basic spectral component to the frequency domain in a Fourier transforming circuit and shifts the phase in a spatial shift circuit, then solves predetermined simultaneous equations in a basic spectrum calculation circuit, finds complex numbers to be multiplied with the phase shifted plurality of signals, multiplying the calculated corresponding complex numbers with the plurality of signals, and adding the results of the multiplication to generate a signal free of the aliasing.

6 Claims, 18 Drawing Sheets

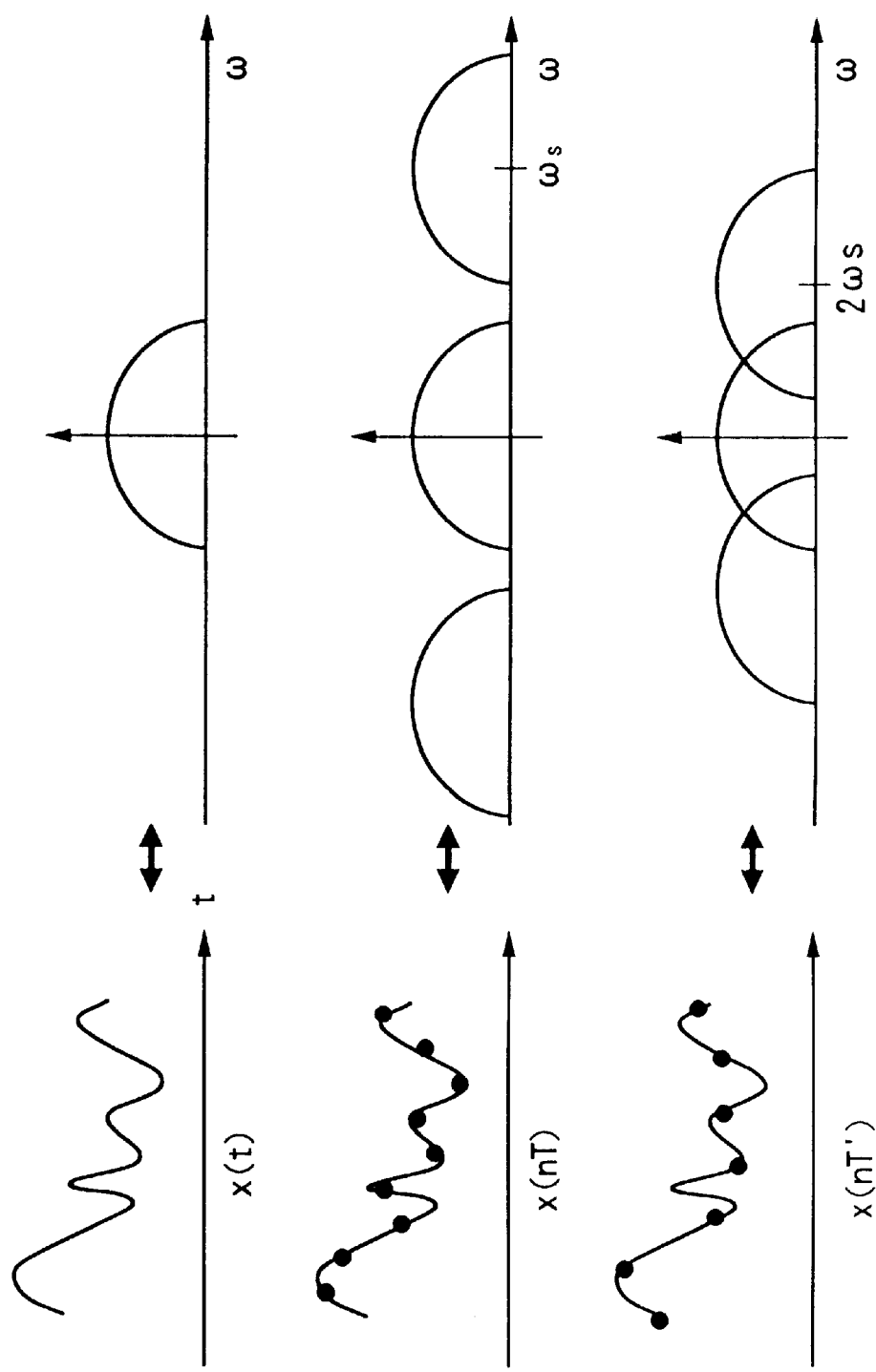

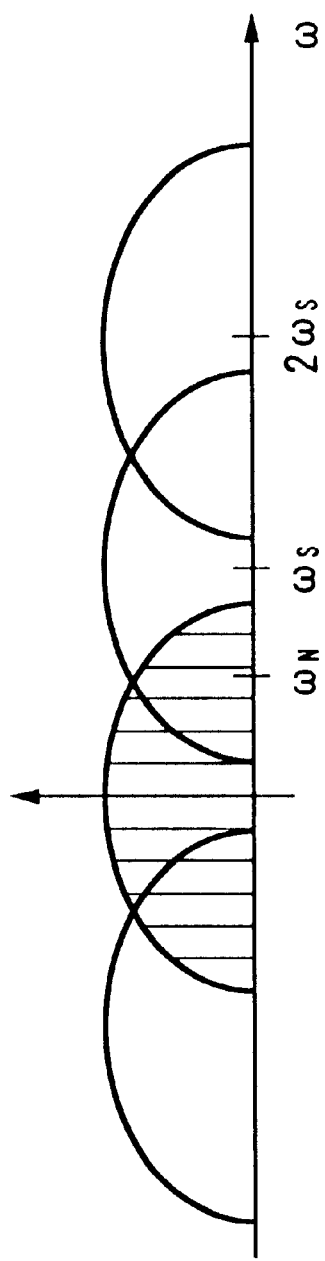
FIG.2A α=0
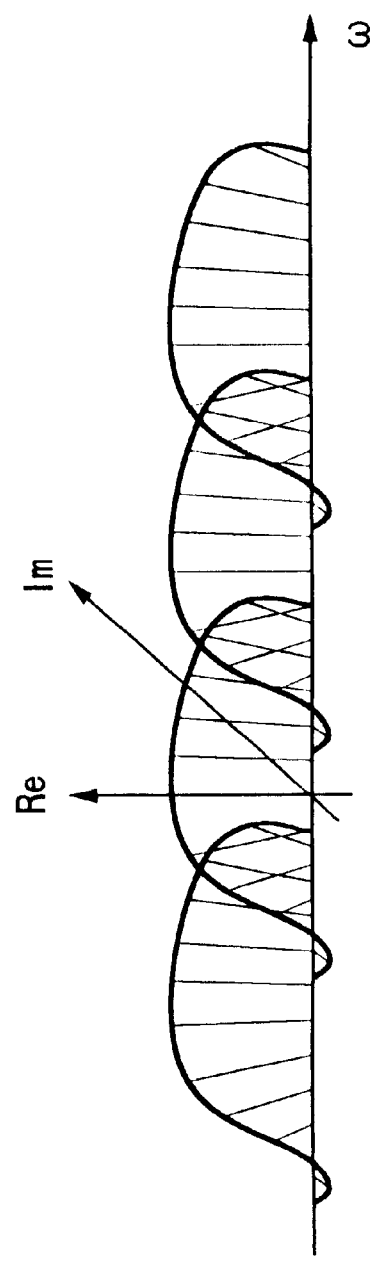
FIG.2B α=π/2

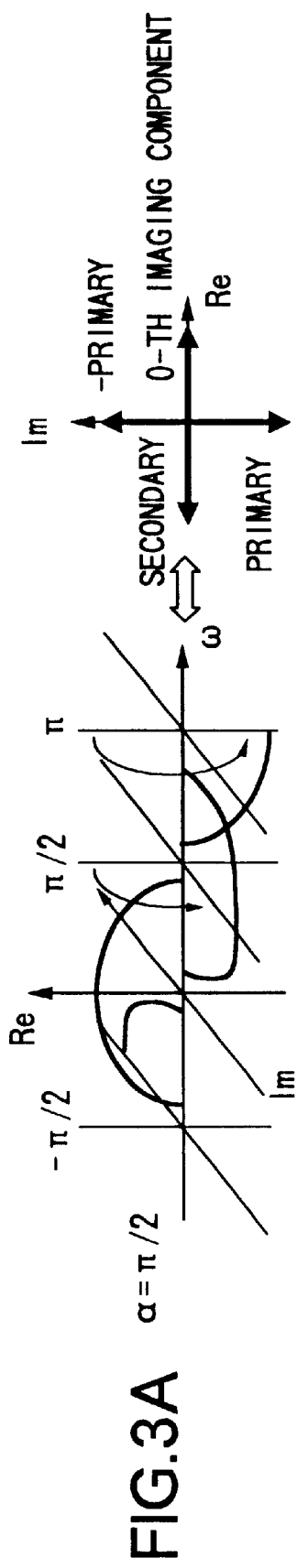
FIG.3A  α=π/2
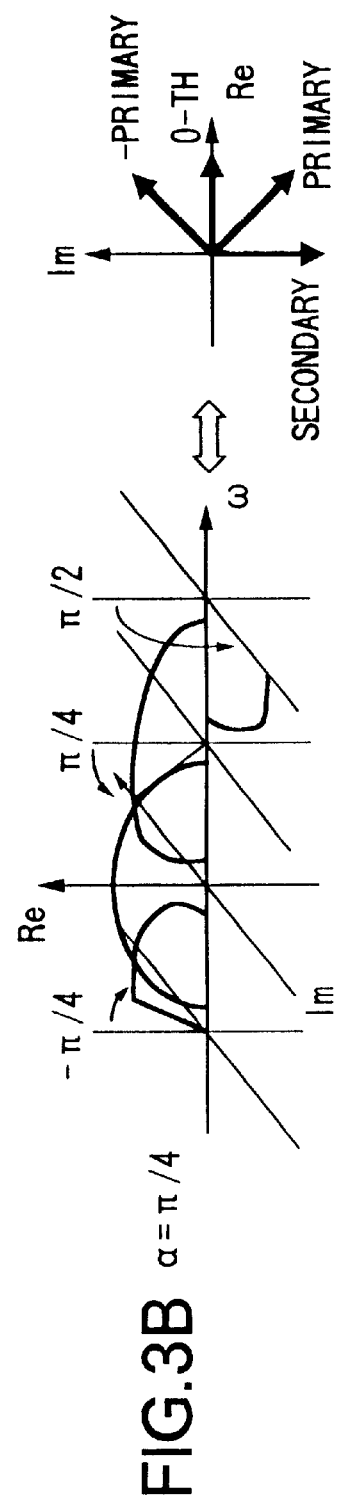
FIG.3B  α=π/4

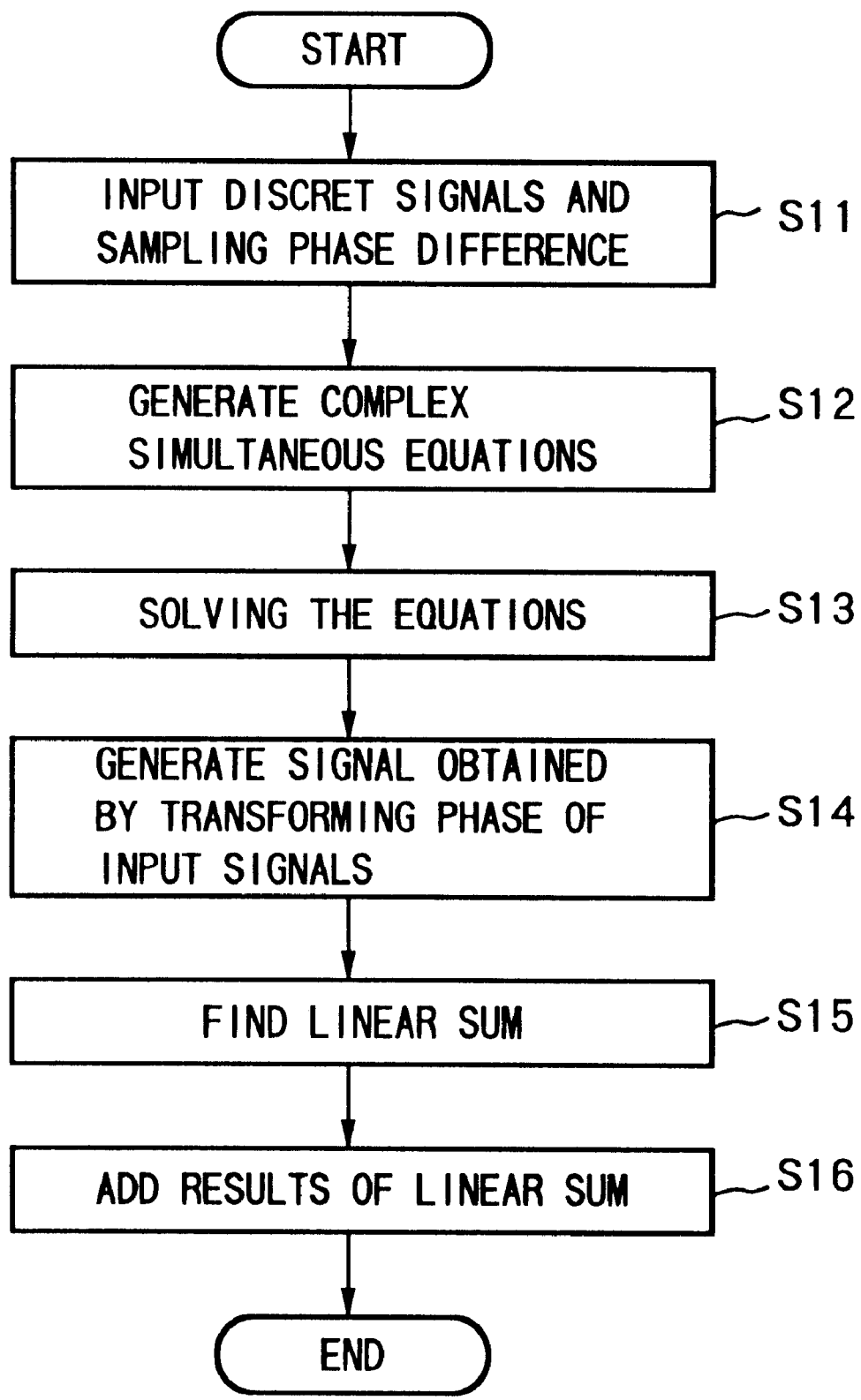

$M_x=M_y=4$

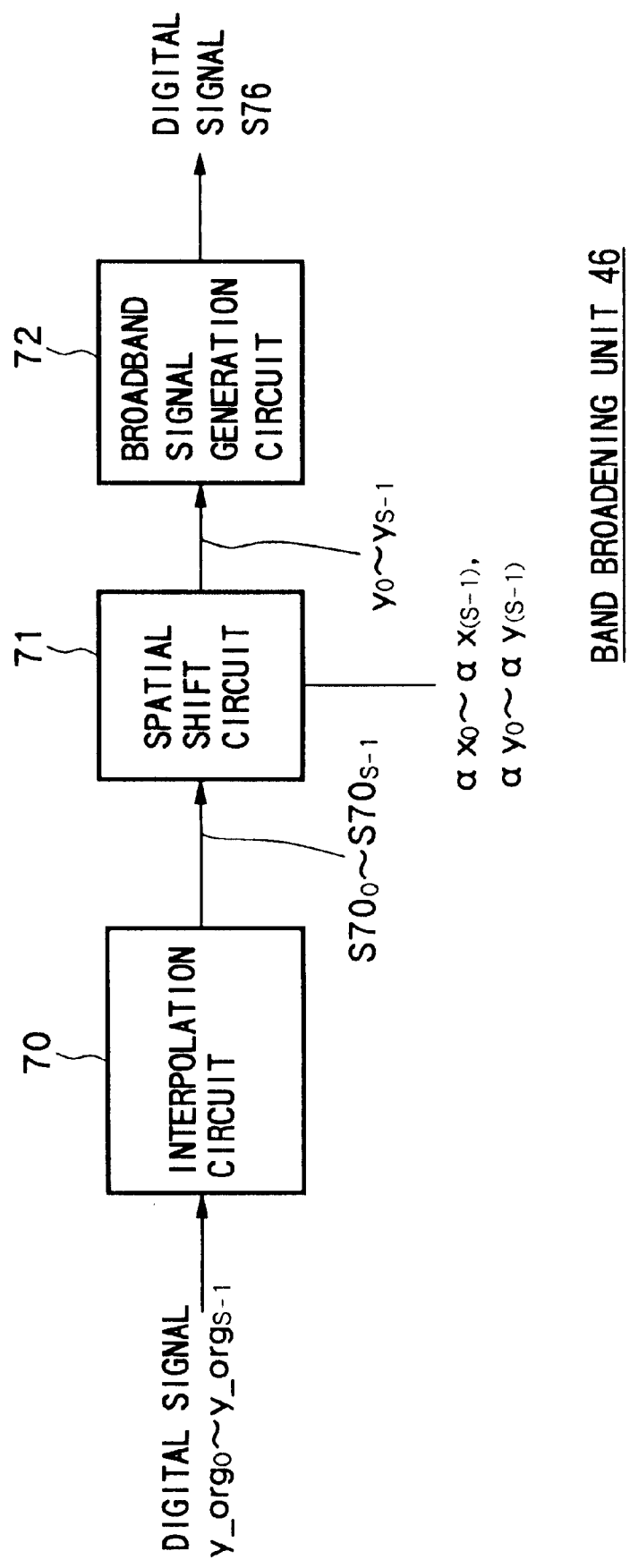

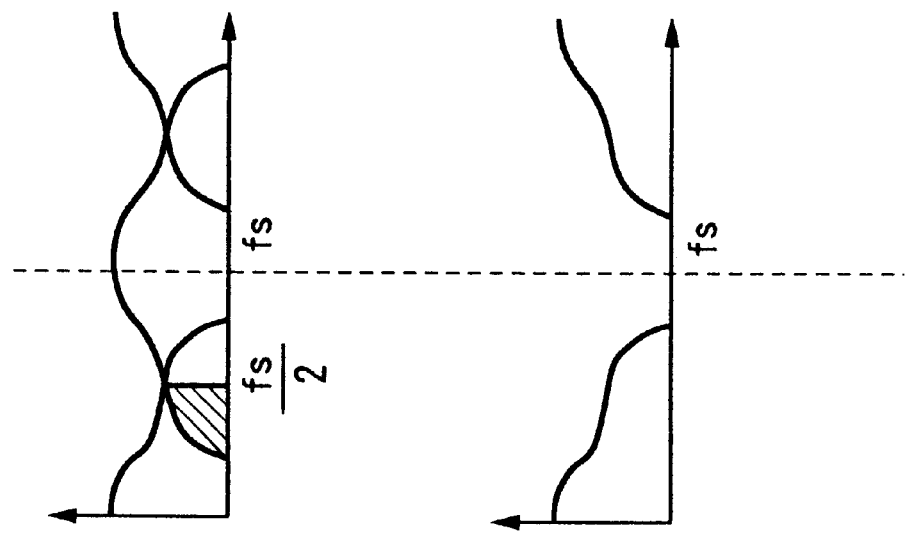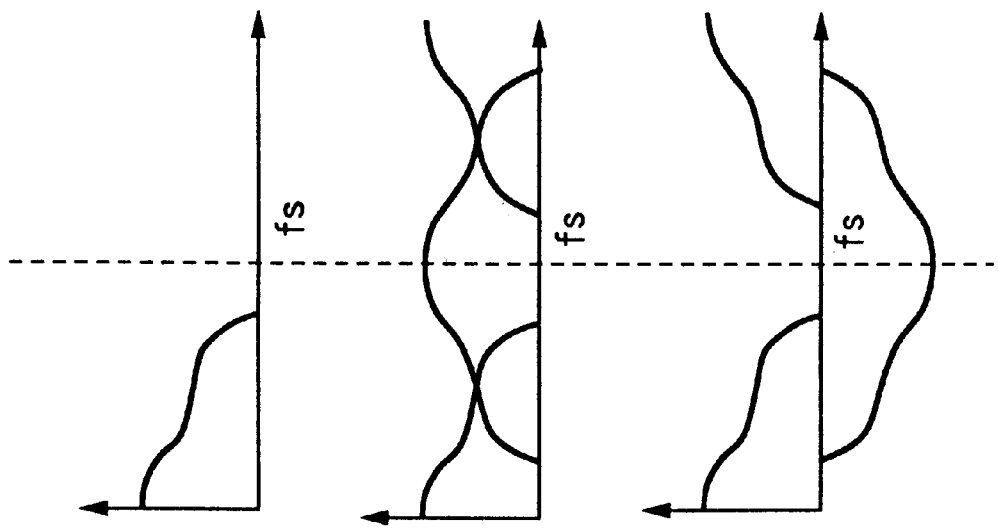

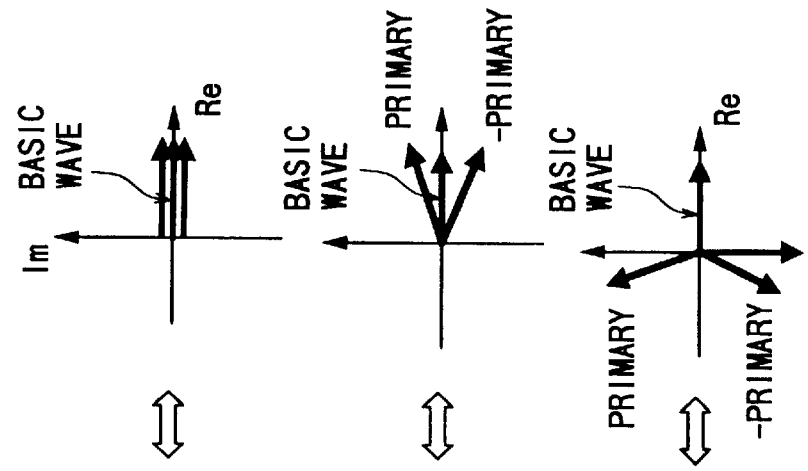
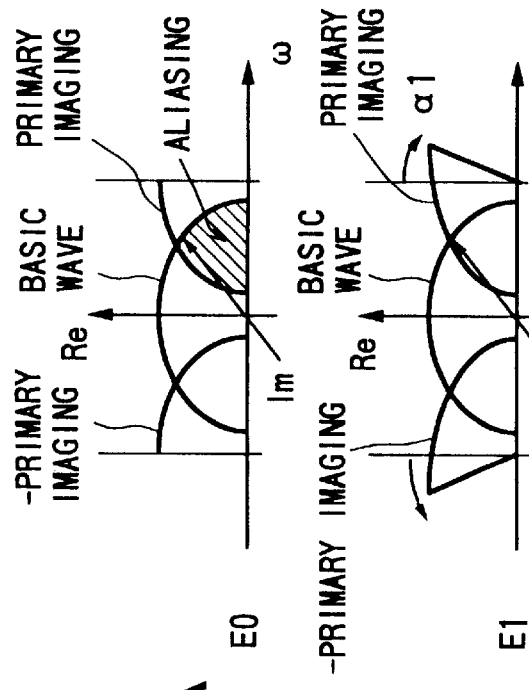
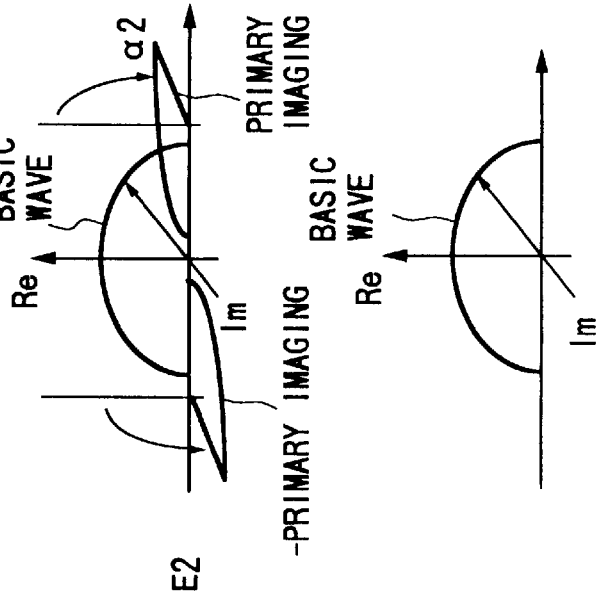
FIG.17A  FIG.17B  FIG.17C  FIG.17D

SIGNAL PROCESSING METHOD

BACKGROUND OF THE INVENTION

1. Field of the Invention

The present invention relates to a signal processing method for eliminating the aliasing occurring due to sampling so as to broaden the band of a signal, more particularly relates to a signal processing method suitable for use when performing a plurality of sampling operations having different phase differences on a pseudo-periodic signal (pseudo static image) having a high correlation occurring at a constant period, such as a television signal, or an identical signal so as to obtain a higher resolution signal (static image).

2. Description of Related Art

In general, when sampling a continuous analog signal on a time basis by a sampling frequency fs to produce a digital signal, the sampling theorum results in the frequency component of the continuous signal above the Nyquist frequency (fs/2) being transformed to the low band side and causes so-called aliasing distortion. Therefore, to avoid this distortion, normally low band pass filtering is performed before the sampling so as to remove the frequency component above fs/2.

The characteristics of this low band pass filtering, however, are not at all ideal. Some frequency component above fs/2 even ends up remaining. As a result, aliasing occurs due to the sampling. This aliasing, for example, in the case of an image, causes the phenomenon of what originally should be a slanted line appearing as steps.

Further, for example, a large number of pixels CCD is expensive, so when using a small number of pixels CCD, the sampling interval becomes larger and the sampling frequency becomes lower. In this case as well, the aliasing is suppressed by cutting the frequency component above fs/2, so only the extremely low frequency component remains and only a blurry image is obtained. That is, in this case, a slanted line does not become steps, but sharp lines end up become blurry edged belts.

The following techniques have been proposed to obtain a high resolution signal with a high sampling frequency from a signal with a low sampling frequency.

Interpolation Method

This technique simply raises the sampling frequency. That is, it creates a new sampling point between sampling points of the original signal. Among the simpler forms, the technique called 0-th hold which repeats the previous value as it is, the linear interpolation method using the linearly interpolated value of the previous and subsequent values, and the techniques called B-spline or cubic convolution are well known. These techniques enable the number of the sampling points to be increased, so for example are suitable for enlarging the display of an image etc.

Technique Using Prediction

This technique reproduces the high band not by simple interpolation, but by estimating what the original analog signal including the high frequency component was like at the same time as raising the sampling frequency.

If an image, for example there is the technique of performing linear interpolation, then changing the pixel values based on the hypothesis that the pixel values of a natural image inherently change smoothly and repeating this several times to reconstruct the high frequency component.

Further, there is the technique of outputting a high-definition signal when an NTSC signal is input by learning in advance the correspondence between the pixels in high definition signals and corresponding pixels in the NTSC signal or several nearby pixels.

Further, there is the technique of outputting the corresponding broad band signal when a narrow band signal is input by learning in advance in the same way for an audio signal.

Sub-Nyquist Sampling Method

FIGS. 16A to 16D are views for explaining the sub-Nyquist sampling method.

FIG. 16A shows the spectrum of a sampled signal. The ordinate shows the signal level, while the abscissa shows the frequency of the signal.

In general, if a sampled signal having the spectrum shown in FIG. 16A is sampled at a sampling frequency fs, a signal having the spectrum shown in FIG. 16B is obtained. In the figure, the hatched portion shows aliasing where the component of the sampled signal above the frequency fs/2 is transformed into a low band.

To suppress this aliasing, first, two series of sampling having a 180 degree relative phase difference are performed on the sampled signal having the spectrum shown in FIG. 16A.

As a result, signals having the spectra shown in FIGS. 16C and 16D are obtained.

Here, the odd number order modulation component of the spectrum of the signal shown in FIG. 16D becomes opposite in phase from the odd number order modulation component of the spectrum of the signal shown in FIG. 16C.

Therefore, by adding the signal having the spectrum shown in FIG. 16C and the signal having the spectrum shown in FIG. 16D, a signal having the spectrum shown in FIG. 16E is obtained.

That is, it is possible to cancel out the primary modulation component included in the signal having the spectrum shown in FIG. 16C and the primary modulation component included in the signal having the spectrum shown in FIG. 16D and thereby eliminate the aliasing. As a result, the signal band can be doubled.

In this sub-Nyquist sampling method, when the phase difference between the two series of sampling operations is 180 degrees, the aliasing can be removed and the signal band doubled. Further, even when performing n number of series of sampling operations with phase differences between adjoining operations of 360/n degrees, it is similarly possible to eliminate the aliasing occurring at the sampling operations and increase the signal band n-fold.

Technique Disclosed in Japanese Unexamined Patent Publication (Kokai) No. 8-336046

In the above sub-Nyquist sampling method, the aliasing was eliminated conditional on the phase difference of the two series of sampling operations being 180 degrees. In this technique, however, aliasing can be eliminated even if the phase difference of the sampling operations is other than 180 degrees.

In this technique, note is taken of the fact that the signal observed as aliasing is due to the M number of imaging (high harmonic) components occurring due to the sampling. The H number of imagings are removed by establishing simultaneous equations by preparing (M+1) number of images.

For example, by sampling a signal having a frequency component up to two times the Nyquist frequency and preparing three digital images including aliasing, a component up to two times the original Nyquist frequency is reconstructed.

The imaging component ends up overlapping the basic spectrum since the sampling frequency is low. This cannot be broken down, so the result is aliasing. Therefore, if the basic spectrum is found, the aliasing is removed.

Specifically, first, the digital signals E0, E1, and E2 of the three images, as shown by FIGS. 17A to 17C, are combinations of the basic frequency $F(\omega)$, the primary imaging $F(\omega-\omega_S)$, and the negative primary imaging $F(\omega+\omega_S)$ Due to the sampling phase difference, each term is subject to an exp term. This can be expressed by the following equations (1).

$$E_0 = F(\omega+\omega_S) + F(\omega) + F(\omega-\omega_S) E_1 =$$

$$\exp(j\alpha_1)F(\omega+\omega_S) + F(\omega) + \exp(-j\alpha_1)F$$

$$(\omega-\omega_S)E_2 =$$

$$\exp(J\alpha_2)F(\omega+\omega_S) + F(\omega) + \exp(-j\alpha_2)F$$

$$(\omega-\omega_S) \ldots \quad (1)$$

In the above equations (1), $\alpha_1$ and $\alpha_2$ are phase differences (rad) with the digital signal $E_0$. These are detected by a known detection method and are considered known. Further, $\omega_S$ shows the sampling frequency.

If it were possible to use the above equations (1) to eliminate the imaging $(\omega-\omega_S)$ and $F(\omega+\omega_S)$ and leave only the frequency $F(\omega)$, then the aliasing could be cancelled.

Here, if the weighting coefficients $w_0$, $w_1$, and $w_2$ are multiplied with the equations (1), the following equations (2) are obtained.

$$w_0 E_0 = w_0 F(\omega+\omega_S) + w_0 F(\omega) + w_0 F$$

$$(\omega-\omega_S)w_1 E_1 = w_1 \exp(j\alpha_1)F(\omega+\omega_S) + w_1 F$$

$$(\omega) + w_1 \exp(-j\alpha_1)F(\omega+\omega_S)w_2$$

$$E_2 = w_2 \exp(j\alpha_2)F(\omega+\omega_S) + w_2 F$$

$$(\omega) + w_2 \exp(-j\alpha_2)F(\omega-\omega_S) \quad (2)$$

where, $$\sum_i w_i = 1 \quad (3)$$

$$\sum_i w_i \exp(j\alpha_i) = 0$$

that is, $$\sum_i w_i \cos(\alpha_i) = 0$$

and $$\sum_i w_i \sin(\alpha_i) = 0$$

Here, by determining the weighting coefficients $w_0$, $w_1$, and $w_2$ so as to satisfy the above equations (2), it is possible to solve the simultaneous equations to cancel all of the imaging terms and leave only the term of the basic frequency $F(\omega)$ and possible to find the basic frequency $F(\omega)$ shown in FIG. 17D from equation (4). Due to this, the aliasing can be removed and the band broadened. Here, $W_L$ is a real number.

$$F(\omega) = w_0 E_0 + w_1 E_1 + w_2 E_2 \ldots \quad (4)$$

Phase Shift Method

This technique is disclosed in Japanese Unexamined Patent Publication (Kokai) No. 7-245592 of the same assignee and cancels the aliasing from the two input signals (input image) including frequency components up to two times the Nyquist frequency to reconstructs the frequency component up to two times the Nyquist frequency.

This technique also cancels the imaging component in the same way as the technique disclosed in the above Japanese Unexamined Patent Publication (Kokai) No. 8-336046. It not only adjusts the gain of the input image, but also shifts the phase.

Here, the "phase shift" is processing for changing the phase characteristics while passing the entire band as in for example Hilbert transformation. When viewing the spectrum on a complex plane, gain adjustment is an operation for changing the absolute value of a vector, while phase shift is an operation for rotating the vector.

As clear from the law of addition of vectors, to cancel a vector exhibiting imaging by just gain adjustment, when the angle formed by the vectors is other than 180 degrees, two vectors are not enough. A minimum of three vectors becomes necessary.

As opposed to this, if performing a phase shift in addition to gain adjustment, as shown in FIGS. 18A to 18C, no matter what the angle is between the vectors of the digital signals $E_0$ and $E_1$, it is possible to make the angle 180 degrees by rotation and possible to cancel the imaging vector by two vectors. That is, if an image signal, two input images are enough.

Summarizing the problems to be solved the invention, in the above interpolation method, there is the problem that the high frequency component of above fs/2 lost once in sampling from a continuous signal cannot be reconstructed and only a blurry image or distorted image can be obtained.

Further, in the above prediction technique, there is the problem that the probability of accurate prediction is still low.

Further, in the above sub-Nyquist sampling method, there is the problem that it is only possible to eliminate the aliasing when the phase difference in the two series of sampling operations is 180 degrees.

Further, in the technique disclosed in the above Japanese Unexamined Patent Publication (Kokai) No. 8-33604, at least three images were necessary in the case of a one-dimensional signal, so reproduction was not possible when that number of images could not be prepared. Further, in the technique disclosed in Japanese Unexamined Patent Publication (Kokai) No. 9-69755 applying this technique to a two-dimensional signal, nine signals are required in order to reproduce up to double the Nyquist frequency in two dimensions for the vertical and horizontal directions. Therefore, for example, if trying to remove the aliasing due to high order imaging components, the number of necessary images becomes extremely large. It becomes difficult to prepare that many images.

Further, in the phase shift technique disclosed in the above Japanese Unexamined Patent Publication (Kokai) No. 7-245592, it is described to reduce the number of images necessary, but it is not disclosed specifically how to remove the high order imaging components. Further, the above publication does not disclose the case where the phase difference of the sampling operations is two-dimensional.

SUMMARY OF THE INVENTION

An object of the present invention is to provide a signal processing method suitably removing even the higher order imaging components causing aliasing included in a digital signal obtained by sampling so as to reproduce a broad band signal free of aliasing.

According to a first aspect of the present invention, there is provided a signal processing method for removing from a plurality of discrete signals, obtained by sampling an identical or substantially identical continuous signal using sampling phases differing in one-dimensional or two-dimensional directions and including a basic spectral component and imaging components other than the basic spectral component included in the continuous signal, the imaging components and generating a signal in accordance with the basic spectral component, comprising the steps of inputting the plurality of discrete signals including aliasing and differing in sampling phases and the value of the sampling phase difference, generating complex simultaneous equations having the basic spectral component and imaging components as variables, having an amount determined by the phase difference as a coefficient of the imaging components, and having the frequency domain expression of the input signal as a constant, solving the complex simultaneous equations, transforming the input signals to the frequency domain, multiplying complex numbers with the frequency domain expressions of the input signals based on the solutions to the complex simultaneous equations, and adding the results of the multiplication of the complex numbers with the frequency domain expressions of the input signals so as to obtain a signal free of aliasing.

Preferably, the sampling phase difference is one-dimensional.

Alternatively, preferably the method where the signals and the sampling phase difference are two-dimensional, further includes the steps of dividing them into a region where both x and y are positive frequencies and a region where x and y are opposite in sign, generating simultaneous equations for these divided regions, solving the generated simultaneous equations, multiplying complex numbers with the frequency domain expressions of the input signals based on the solutions of the simultaneous equations, and adding the results of multiplication of the complex numbers with the frequency domain expressions of the input signals, and adding the results of addition of the regions where both x and y are positive frequencies and the results of addition of the regions where x and y are opposite in sign to obtain a signal free of aliasing.

According to a second aspect of the present invention, there is provided a signal processing method for removing from a plurality of discrete signals, obtained by sampling an identical or substantially identical continuous signal using sampling phases differing in one-dimensional or two-dimensional directions and including a basic spectral component and imaging components other than the basic spectral component included in the continuous signal, the imaging components and generating a signal in accordance with the basic spectral component, including the steps of inputting the plurality of discrete signals including aliasing and differing in sampling phases and the value of the sampling phase difference, generating complex simultaneous equations having the basic spectral component and imaging components as variables, having an amount determined by the phase difference as a coefficient of the imaging components, and having the frequency domain expression of the input signal as a constant, solving the complex simultaneous equations, generating signals obtained by transforming the phases of the input signals, finding the linear sum of the input signals and signals obtained by transforming the phases of the input signals based on the solutions to the complex simultaneous equations, and adding the results of the linear sums of the input signals to obtain a signal free of aliasing.

Preferably, the sampling phase difference is one-dimensional.

Alternatively, preferably the method where the signals and the sampling phase difference are two-dimensional, further includes the steps of dividing them into a region where both x and y are positive frequencies and a region where x and y are opposite in sign, generating signals obtained by transforming the phases of the signals of the divided regions of the input signals, generating simultaneous equations for the divided regions, solving the generated simultaneous equations, and finding the linear sum of the input signals and the signals obtained by transforming the phases of the input signals based on the solutions of the simultaneous equations, and adding the results of the linear sum of the regions where both x and y are positive frequencies and the results of the linear sum of the regions where x and y are opposite in sign to obtain a signal free of aliasing.

BRIEF DESCRIPTION OF THE DRAWINGS

The above object and features of the present invention will be more apparent from the following description of the preferred embodiments with reference to the accompanying drawings, wherein:

FIGS. 1A to 1C are views for explaining the relationship between the sampling frequency $\omega_S$ and the aliasing;

FIGS. 2A and 2B are views for explaining a spectrum where discrete signals shifted in phase are Fourier transformed;

FIGS. 3A and 3B are views for explaining a spectrum where discrete signals are spatially shifted;

FIG. 10 is a flowchart for explaining the concept of the present invention.

FIG. 15 is a view of the configuration of the band broadening unit of an image system according to a fourth embodiment of the present invention;

FIGS. 16A to 16D are views for explaining the Nyquist sampling method of the related art;

FIGS. 17A to 17D are views for explaining the technique disclosed in Japanese Unexamined Patent Publication (Kokai) No. 336046 of the related art.

DESCRIPTION OF THE PREFERRED EMBODIMENTS

Figure 4:
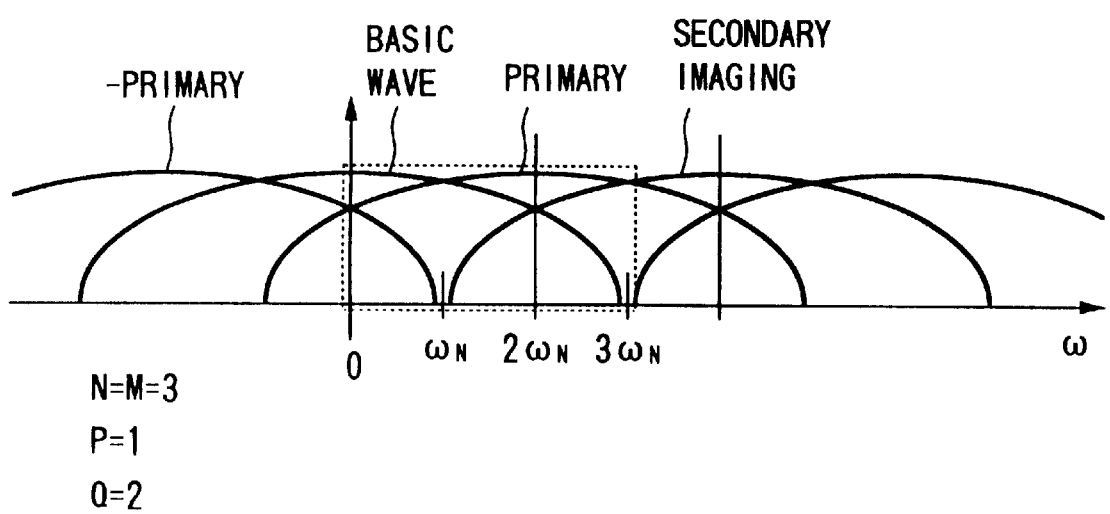
FIG. 4 is a view for explaining the imaging component present in a positive frequency up to a frequency three times the Nyquist frequency $\omega_N$, that is, $3\omega_N$.

Below, an explanation will be made of preferred embodiments of the present invention.

First, an explanation will be made of the principles behind the signal band broadening technique employed by the signal processing method of the present invention.

Band Broadening Technique Using Shift in One-Dimensional Direction

Here, an explanation will be made of the technique of broadening the band of a digital signal using a plurality of discrete signals (digital signals) in which the sampling positions are shifted in only the one-dimensional direction.

Below, definitions will be given of the variables:

S: Total number of input digital signals (discrete signals)

L: Indexes $0,1 \ldots, S-1$ of digital signals $Y\_org_L$: L-th digital signal (frequency domain expression)

$y\_org_L$: L-th digital signal (space domain expression)

$Y_L$: L-th digital signal shifted in space (frequency domain expression)

$y_L$: L-th digital signal shifted in space (space domain expression)

$\alpha_L$: Sampling phase difference (rad) of L-th digital signal with respect to 0-th signal $X_i$: i-th imaging component $X(\omega - i \cdot \omega_S)$ when j=0, that is, $x_0$, the basic spectral component P: Number of imaging components with negative orders Q: Number of imaging components with positive orders N: Multiple indicating how many multiples of components with respect to the Nyquist frequency the input continuous signal before sampling contains M: Multiple indicating how many multiples of frequency components with respect to the Nyquist frequency are to be reconstructed, usually N=M $w_L$: Complex number to be multiplied with the L-th digital signal in the frequency domain If the original signal, that is, the continuous signal x(t), is one-dimensionally Fourier transformed, an expression $X(\omega)$ in the frequency domain is obtained, but when the continuous signal x(t) is changed to discrete signals x(n) by sampling and they are one-dimensionally Fourier transformed, a spectral component having the same shape as $X(\omega)$ is infinitely produced at every sampling frequency $\omega_S$.

Therefore, the originally existing component centered on $\omega=0$ will be referred to as the basic spectral component, while the others will be referred to as the imaging (high harmonic) components.

Here, the i-th imaging can be expressed as $X(\omega - i \cdot \omega_S)$. Note, when i=0, the basic spectrum is expressed. Accordingly, $Y(\omega)$ obtained by one-dimensionally Fourier transforming the related discrete signals x(n) becomes as shown in the following equation 5:

$$Y(\omega) = \Sigma X(\omega - i \cdot \omega_S) \quad (5)$$

It is clear from FIG. 1 that the imaging components do not overlap each other if the sampling frequency $\omega_S$ is 2 or more times the band of the basic spectral component. In this case, it is possible to reproduce the original continuous signal from the discrete signals.

Note that FIG. 1A shows the waveform of the continuous signal x(t) on the time axis and the frequency spectrum thereof, and FIG. 1B shows the waveform of the discrete signals (xnT) on the time axis when the sampling frequency $\omega_S$ is 2 or more times the band of the basic spectrum component and the frequency spectrum thereof.

On the other hand as shown in FIG. 1C, the sampling frequency $\omega_S$ is not sufficiently large in comparison with the band of the basic spectrum component, therefore when the imaging components do not overlap each other, the overlapped parts becomes aliasing. This means that components which do not exist in the original signal enter into it, and the original continuous signal cannot be reproduced as it is. This is generally referred to as the sampling theorem.

Note that, FIG. 1C shows the waveform of the discrete signals (xnT) on the time axis when the sampling frequency $\omega_S$ is less than two times the band of the basic spectral component and the frequency spectrum thereof.

Further, a case of finely changing the sampling position (sampling phase) of the same continuous signal to obtain a first discrete signal (digital signal) and second discrete signal will be considered.

Here, when the sampling position of the second discrete signal is delayed from the sampling position of the first discrete signal by exactly $\alpha/(2\Pi)$ with respect to the sampling cycle, that is, exactly by $\alpha$(rad) when the sampling cycle is $2\Pi$, the one-dimensional Fourier transform of the first discrete signal becomes as shown in equation (5) and is illustrated in FIG. 2A. Further, the one-dimensional Fourier transform of the second discrete signal becomes as shown in the following equation (6) and is illustrated in FIG. 2B.

$$Y(\omega) = \exp(j \cdot \omega \alpha / (2\pi)) \sum_{i=-\infty}^{\infty} \exp(-j \cdot i\alpha) X(\omega - i\omega_S) \quad (6)$$

Next, it is necessary to spatially shift a plurality of input signals having a sampling phase difference according to the sampling phase difference.

Spatial shift means to place each sample at a position where that sample originally existed based on the sampling phase difference.

The input discrete signals are input only as the discrete signals x(n) where n is an integer no matter what the value of the sampling phase difference, but for example a sampling position of the second discrete signal is located between two adjoining sampling positions of the first discrete signal.

Therefore, the input discrete signals are interpolated at a sufficiently fine sampling interval, then spatial shift processing is carried out based on the sampling phase difference to shift them to the proper positions.

When the discrete signals x(n) are spatially shifted, in view of the nature of a one-dimensional Fourier transform, the result becomes the following equation (7). When illustrating this, the result becomes FIGS. 3A and 3B. Note that FIGS. 3A and 3B show the case where the frequency band is enlarged by 4 or more times, in which FIG. 3A is a view of a case where the sampling phase difference $\alpha=\Pi/2$, and FIG. 3B is a view of a case where $\alpha=\Pi/4$.

$$Y(\omega) = \sum_{i=-\infty}^{\infty} \exp(-j \cdot i\alpha) X(\omega - i\omega_S) \quad (7)$$

Further, the above spatial shift processing can be carried out even in the frequency domain.

Namely, exp(jωα/(2Π)) may be multiplied. By this, exactly the same thing as a spatial shift can be obtained.

After obtaining spatially shifted signals, they are used to generate complex simultaneous equations.

Here, for simplification, where the i-th imaging component is $X_i$, an L-th signal after the spatial shift processing in the case where an L-th discrete signal is input is $Y_L$, and $\alpha_L$ is the sampling phase difference of the L-th discrete signal, $Y_L$ is the sum of the i-th imaging components, so is as indicated by the following equation (8):

$$YL = \sum_{i=-P}^{Q} \exp(-j \cdot i\alpha_L) X_i \quad (8)$$

where, L=0, 1, . . . , S-1

Here, if the number of the imaging components is S, if S number of discrete signals are prepared, from the S number of complex simultaneous equations generated based on equation (8), there are S number of equations with respect to S number of unknown variables $X_i$, therefore, this equation can be solved and the basic spectrum component $X_0$ to be found can be found as in the following equation (9). In the following equation (9), $W_L$ is the complex number determined by α found by solving equation (8)

$$X_0 = \sum_{i=0}^{S-1} w_L Y_L \quad (9)$$

Here, in order to reproduce the frequency band of the continuous signal up to M times the Nyquist frequency $\omega_N$ of the input discrete signals, the imaging components other than the baste spectrum entering into the related frequency band must be eliminated. Conversely, originally the imaging components are infinitely generated, but if only the imaging entering into the related frequency band can be erased, the result is only the basic spectrum inside the frequency band $M \cdot \omega_N$, and the related frequency band of the original continuous signal can be reproduced.

Namely, when considering the number of imaging components entering into the frequency band indicated by $0 \leq \omega \leq M \cdot_N$, when assuming that the frequency band of the basic spectrum component is up to N times the Nyquist frequency $\omega_N$, the number of the imaging components entering into the related frequency band becomes P+Q, and the number of components including the basic spectrum becomes P+Q+1.

Here, P=FLoor ((N−1)/2) Q=FLoor ((N+M−1)/2).

Further, FLoor(n) indicates the maximum integer not exceeding n, P indicates the number of imaging components with negative orders, and Q indicates the number of imaging components with positive orders.

Accordingly, the number S of required discrete signals becomes S=P+Q+1, so the number can be reduced in comparison with that of the related art.

The example of the case where N=M=3 is shown in FIG. 4.

As shown in FIG. 4, in the positive frequency up to a frequency three times the Nyquist frequency $\omega_N$, that is, $3\omega_N$, there are negative primary, primary, and secondary imaging components. These cause aliasing.

Note that the aliasing which can be canceled is up to the N-th order, therefore there is no meaning if N<M.

In general, a frequency also takes a negative value, but in the case of a one-dimensional digital signal, the positive and negative are conjugate, therefore if only a positive frequency can be reproduced, the negative frequency can be obtained by finding the conjugated value of the reproduced positive frequency. Accordingly, the positive frequency may be found by using S number of complex simultaneous equations mentioned above.

As explained above, the basic spectral component can be obtained based on the S number of discrete signals and their sampling phase differences. For this purpose, the complex number $w_L$ is multiplied with the $Y_L$ obtained by spatially shifting the S number of discrete signals.

Below, an explanation will be made of the processing for multiplication with the complex number $w_L$.

If the processing is carried out in the frequency domain, $w_L$ may be multiplied as it is.

Further, if the processing is carried out in the space domain (time domain), for example the following processing may be carried out.

First, a Hilbert transform is applied to the space domain expression of $Y_L$, that is, $y_L$ and the obtained signal is defined as $y_L'$. By this, $y_L'$ becomes advanced in phase by Π/2 with respect to $y_L$. This is equivalent to $Y_L$ multiplied by j in the frequency domain. Here, j is an imaginary number unit. Accordingly, multiplication of the complex number $w_L$ with $Y_L$ means obtaining a linear sum of $y_L$ and $y_L'$.

Then, in order to finally obtain the basic spectral component $X_0$, $w_L$ and $Y_L$ may be found with respect to all of the S number of discrete signals and added.

Above, the principle of the technique for broadening the band of the discrete signals (digital signals) by using a plurality of discrete signals with sampling position shifted in only the one-dimensional direction was explained.

First Embodiment

An explanation will be made next of an image system employing the technique of broadening the band of a digital signal by using a plurality of digital signals (discrete signals) with sampling positions shifted in only the one-dimensional direction.

Figure 5:
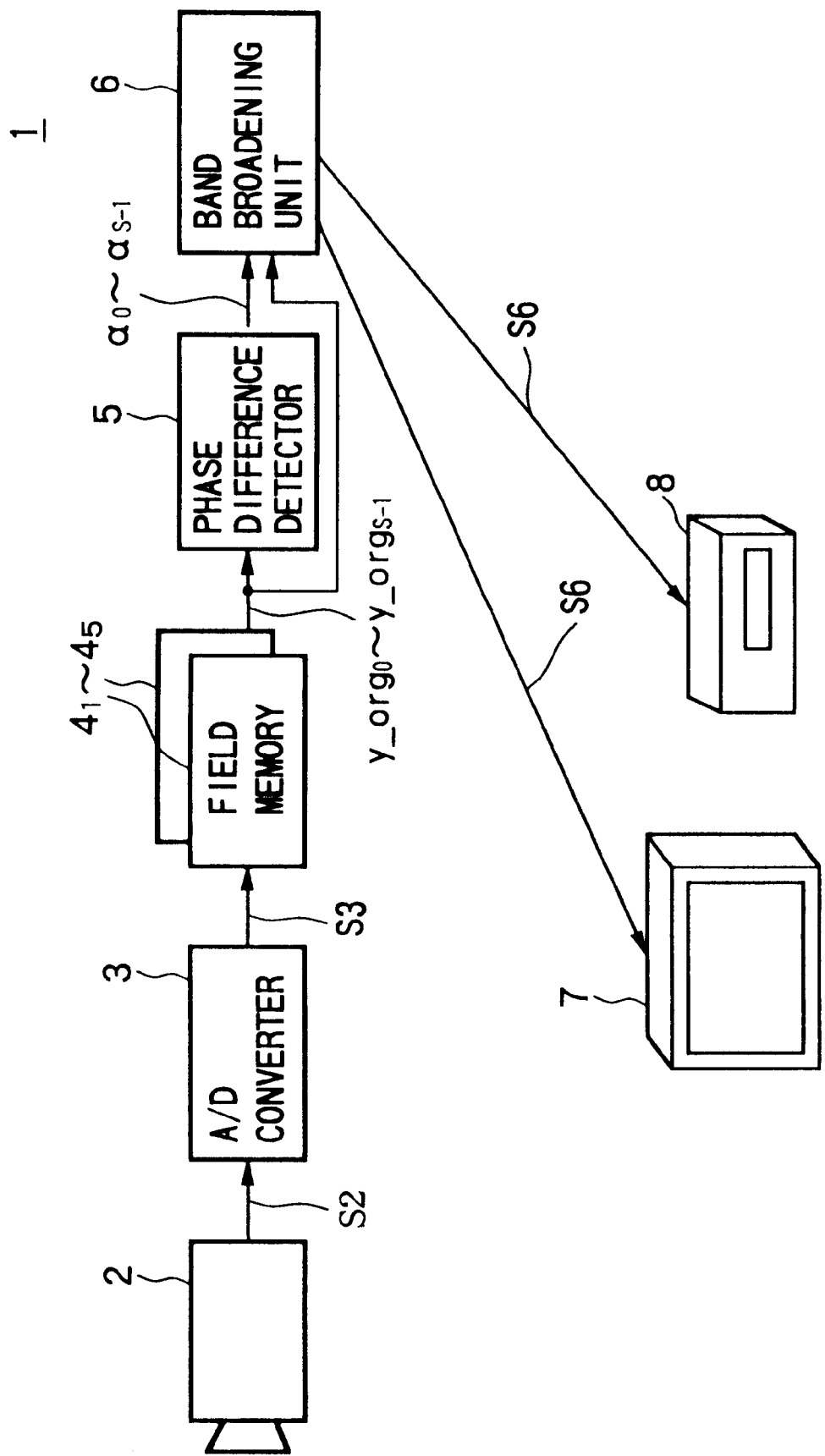
FIG. 5 is a view of the configuration of the image system according to a first embodiment of the present invention.

FIG. 5 is a view of the configuration of an image system 1 of the present embodiment.

As shown in FIG. 5, the image system 1 has a CCD camera 2, an A/D converter 3, field memories $4_0$ to $4_{S-1}$, a phase difference detector 5, a band broadening unit 6, a display 7, and a printer 8.

The CCD camera 2 outputs a continuously obtained plurality of stationary images as a camera signal S2 to the A/D converter 3 while moving in a horizontal direction.

The A/D converter 3 samples the stationary image signals contained in the camera signal S2, converts them to a digital signal, and outputs the digital signal S3 to the. field memories $4_0$ to $4_{S-1}$.

At this time, assume that the camera signal S2 includes a frequency band up to N times the Nyquist frequency of the sampling in the A/D converter 3.

Further, the A/D converter 3 individually converts the stationary image signals of the S number of stationary images contained in the camera signal S2 from an analog to digital format to obtain S number of digital signals and stores them in the field memories $4_0$ to $4_{S-1}$.

Note that, in the present embodiment, the sampling positions of the S number of digital signals are shifted from each other in only the one-dimensional direction.

The field memories $4_0$ to $4_{S-1}$ store the S number of digital signals y__org$_0$ to y__org$_{S-1}$ obtained from the S number of stationary images.

The phase difference detector 5 detects the phase difference of the digital signals y__org$_0$ to y__org$_{S-1}$ with respect to the digital signal y__org$_0$ based on the digital signal y__org$_0$ read from the field memory $4_0$ by using for example a gradient method or a block matching method and outputs the related phase difference $\alpha_0$ to $\alpha_{S-1}$ to the band broadening unit 6.

The band broadening unit 6 eliminates the aliasing due to the imaging components up to the high order by using the digital signals y__org$_0$ to y__org$_{S-1}$ input from the field memories $4_0$ to $4_{S-1}$ and the phase differences $\alpha 0$ to $\alpha_{S-1}$ input from the phase difference detector 5 and generates a digital signal S6 having a high resolution.

Figure 6:
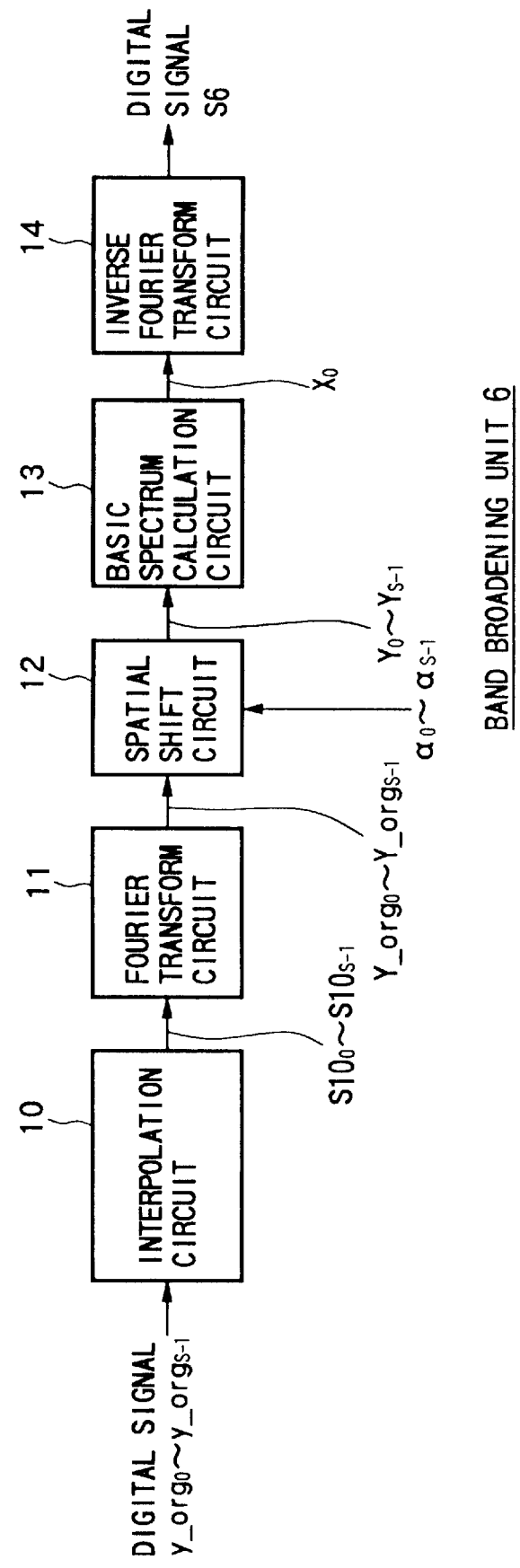
FIG. 6 is a view of the configuration of the band broadening unit shown in FIG. 5.

FIG. 6 is a view of the configuration of the band broadening unit 6.

As shown in FIG. 6, the band broadening unit 6 has an interpolation circuit 10, a Fourier transform circuit 11, a spatial shift circuit 12, a basic spectrum calculation circuit 13, and an inverse Fourier transform circuit 14.

The interpolation circuit 10 inserts a zero value between sampling positions of the digital signals y__org$_0$ to y__org$_{S-1}$ input from the field memories $4_1$ to $4_S$ to create the digital signals S10$_0$ to S10$_{S-1}$ and outputs them to the Fourier transform circuit 11.

Figure 7:
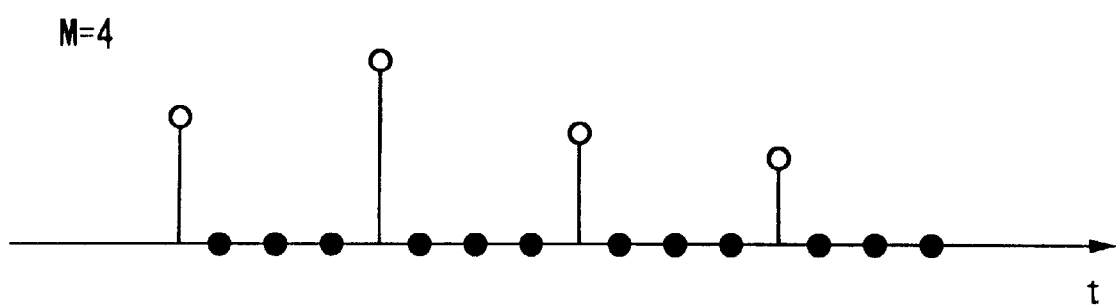
FIG. 7 is a view for explaining the processing of the interpolation circuit shown in FIG. 6.

Here, in order to reproduce the M-fold frequency band, as shown in FIG. 7, M−1 number of zeros are inserted between the sampling positions. Note that FIG. 7 shows the example of the case where M=4. In the figure, a white circle indicates the level of a sampling position, while a black circle indicates an inserted zero level.

The Fourier transform circuit 11 outputs Y__org$_0$ to Y__org$_{S-1}$ obtained by a one-dimensional Fourier transform of the digital signals S10$_0$ to S10$_{S-1}$ input from the interpolation circuit 10 to the spatial shift circuit 12.

The spatial shift circuit 12 performs spatial shifting with respect to the Y__org$_0$ to Y__org$_{S-1}$ input from the Fourier transform circuit 11 by using the phase differences $\alpha_0$ to $\alpha_{S-1}$ input from the phase difference detector 5 to generate Y$_0$ to Y$_{S-1}$.

Namely, exp(j$\omega\alpha_0$/(2Π)) to exp(j$\omega\alpha_{S-1}$/(2Π)) are multiplied with Y__org$_0$ to Y__org$_{S-1}$.

Note, when M$\omega_N$<$\omega$<M$\omega_S$, exp(j($\omega-\omega_S$)$\alpha_0$/(2Π)) to exp (j($\omega-\omega_S$)$\alpha_{S-1}$/(2Π)) must be multiplied. This is because this part is originally a negative frequency, so the negative frequency must be a value conjugate with the positive frequency from the nature of the Fourier transform.

Note that in order to reduce the amount of computation, multiplication is not actually carried out. It is sufficient to find the value conjugate with the low band side (positive frequency). Further, the nature of conjugation must always be preserved. Therefore, in the present embodiment, the operation is carried out only for 0≦$\omega$≦M$\omega_N$ until the final result is obtained after a series of processing is terminated. The conjugated value of the low band side (that is, the positive frequency) in the final result is found for M$\omega_N$<$\omega$<M$\omega_N$.

Here, the following equation (10) stands from the above equation (8):

$$Y_L = \sum_{i=-P}^{Q} \exp(-j \cdot i\alpha_L)X_i \qquad (10)$$

where, L=0, 1, . . . , S−1

The basic spectrum calculation circuit 13 multiplies with Y$_0$ to Y$_{S-1}$ the complex numbers w$_0$ to w$_{S-1}$ obtained by solving the equation (10) and adds the results of these multiplication operations to obtain the following equation (11) from the equation (9), finds the basic spectral component X$_0$, and outputs this to the inverse Fourier transform circuit 14.

At this time, equation (10) is solved by defining X$_i$ as a variable and Y$_L$, exp(−J·i·$\alpha_L$) as constants and the complex numbers w$_0$ to w$_{S-1}$ are calculated.

$$X_0 = \sum_{i=0}^{S-1} w_L Y_L \qquad (11)$$

Note that the basic spectrum calculation circuit 13 finds the conjugated value here when the conjugated value is to be finally obtained by the negative frequency. Namely, by finding the w$_L$·Y$_L$ of equation (11) for the positive frequency and finding the conjugate, w$_L$·Y$_L$ of equation (11) for the negative frequency is found and w$_L$·Y$_L$ of the positive frequency and w$_L$·Y$_L$ of the negative frequency are added to find the basic spectral component X$_0$.

This means that the aliasing up to the M-th order was canceled.

The Fourier transform circuit 14 performs one-dimensional inverse Fourier transform on the basic spectral component X$_0$ input from the basic spectrum calculation circuit 13 to obtain the band broadened digital signal S6.

Next, an explanation will be made of the function of the band broadening unit 6.

First, the interpolation circuit 10 inserts a zero value between sampling positions of the digital signals y__org$_0$ to y__org$_{S-1}$ input from the field memories $4_1$ to $4_S$ to generate digital signals S10$_0$ to S10$_{S-1}$.

Next, the digital signals S10$_0$ to S10$_{S-1}$ are one-dimensionally Fourier transformed at the Fourier transform circuit 11 and Y__org$_0$ to Y__org$_{S-1}$ of the frequency domain expression are output to the spatial shift circuit 12.

Next, Y__org$_0$ to Y__org$_{S-1}$ are one-dimensionally spatially shifted in the spatial shift circuit 12, and Y$_0$ to Y$_{S-1}$ are created.

Next, the basic spectrum calculation circuit 13 multiplies with Y$_0$ to Y$_{S-1}$ the complex numbers w$_0$ to w$_{S-1}$ and adds the products to find the basic spectral component X$_0$ and outputs this to the inverse Fourier transform circuit 14.

Then, the basic spectrum component X$_0$ is inversely Fourier transformed at the inverse Fourier transform circuit 14 to obtain the band broadened digital signal S6.

As explained above, according to the image system 1, the S number of digital signals y__org$_0$ to y__org$_{S-1}$ are obtained from the camera signal S2 of the CCD camera 2, the phase differences $\alpha_0$ to $\alpha_{S-1}$ are obtained at the spatial shift circuit 12, and the processing mentioned above is carried out in the band broadening unit 6 shown In FIG. 6. whereby a smaller number of digital signals than in the related art can be used to remove the Imaging components which become factors of the aliasing and reproduce a signal of a frequency band M times the Nyquist frequency $\omega_N$.

Below the concept of the present invention will be explained.

Figure 8:
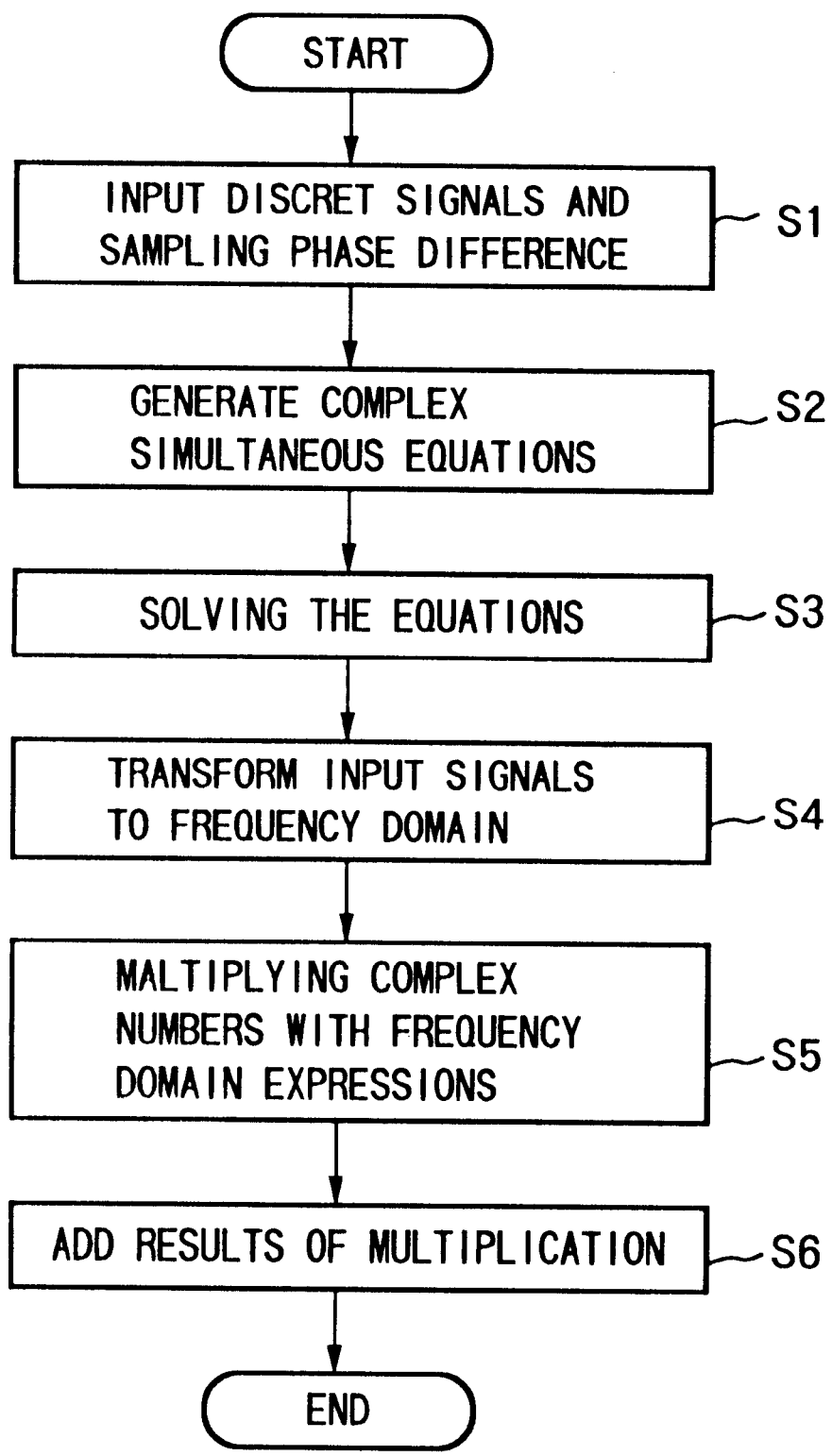
FIG. 8 is a flowchart for explaining the concept of the present Invention.

FIG. 8 is a flowchart for explaining the concept of the present Invention.

Step S1: The plurality of discrete signals including aliasing and deferring in sampling phases and the value of the sampling phase difference are reviewed as input.

Step S2: Complex simultaneous equations having the basic spectral component and imaging components as variables, having an amount determined by the phase difference as a coefficient of the imaging components, and having the frequency domain expression of the input signal as a constant are generated.

Step S3: The complex simultaneous equations are solved.

Step S4: The input signals are transformed to the frequency domain.

Step S5: The operation of multiplying complex numbers with the frequency domain expressions of the input signal based on the solutions to the complex simultaneous equations is performed.

Step S6: The operation of adding the results of the multiplication of the complex numbers with the frequency domain expressions of the input signals is performed so as to obtain a signal free of aliasing.

Second Embodiment

In the above first embodiment, as shown in FIG. 6, the case where the spatial shift and the calculation of the basic spectrum were carried out in the frequency domain was exemplified, but in the present embodiment, the explanation will be made of the case where these processings are carried out in the space domain (time domain).

The image system of the present embodiment is the same as the image system 1 of the first embodiment except for the configuration of the band broadening unit shown in FIG. 5 and FIG. 6.

Below, an explanation will be given of the band broadening unit of an image system of the present embodiment.

Figure 9:
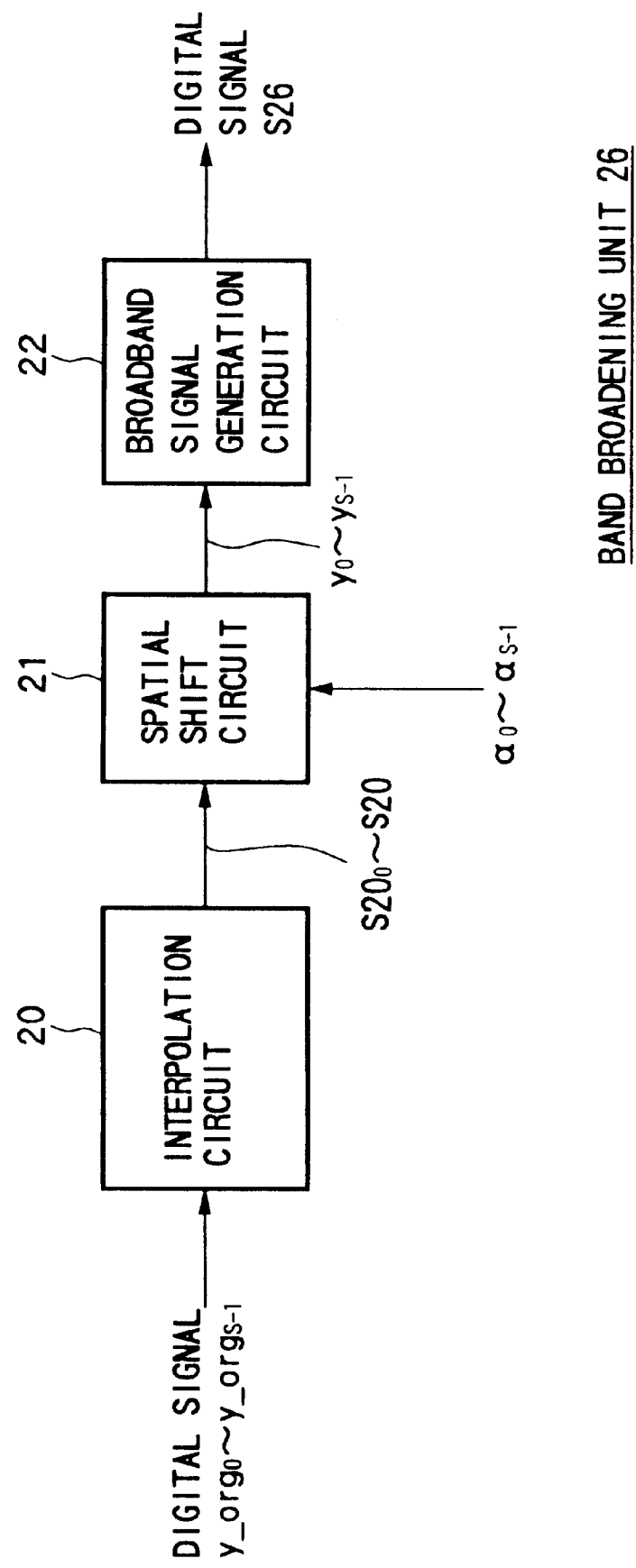
FIG. 9 is a view of the configuration of the band broadening unit of an image system according to a second embodiment of the present invention.

FIG. 9 is a view of the configuration of a band broadening unit 26 of the present embodiment.

As shown in FIG. 9, the band broadening unit 26 has an interpolation circuit 20, a spatial shift circuit 21, and a broadband signal generation circuit 22.

The interpolation circuit 20 interpolates between sampling positions of the digital signals $y\_org_0$ to $y\_org_{S-1}$ input from the phase difference detector 5 shown in FIG. 6 to generate the digital signals $S20_0$ to $S20_{S-1}$.

The spatial shift circuit 21 shifts the digital signals $S20_0$ to $S20_{S-1}$ input from the interpolation circuit 20 by exactly the amount of the phase difference with the digital signal $S20_0$ using the phase differences $\alpha_0$ to $\alpha_{S-1}$ to generate the signals $y_0$ to $y_{S-1}$.

Specifically, it eliminates a few samples at the head of the digital signals $20_0$ to $S20_{S-1}$ having an increased number of samples or adds a few samples of appropriate values to the head to create the signals $y_0$ to $y_{S-1}$.

The broadband signal creation circuit 22 performs a Hilbert transform on the signals $y_0$ to $y_{S-1}$ input from the spatial shift circuit 21 to generate $y_0'$ to $y_{S-1}'$.

Then, the complex numbers $w_0$ to $w_{S-1}$ obtained by solving complex simultaneous equations similar to equation (10) are multiplied with respect to the signals $y_0$ to $y_{S-1}$ and the results of the multiplication operations are added to generate the digital signal S26 in which the aliasing up to the M-th order is canceled.

At this time, the multiplication of the complex numbers $w_0$ to $w_{S-1}$ with the signals $y_0$ to $y_{S-1}$ is carried out by finding "$y_L \cdot Re(w_L) + y'_L \cdot Im(w_L)$" where $0 \leq L \leq S-1$.

Below the concept of the present invention will be explained.

FIG. 10 is a flowchart for explaining the concept of the present invention.

Step S11: The plurality of discrete signals including aliasing and differing in sampling phases and the value of the sampling phase difference are reviewed as input.

Step S12: Complex simultaneous equations having the basic spectral component and imaging components as variables, having an amount determined by the phase difference as a coefficient of the imaging components, and having the frequency domain expression of the input signal as a constant are generated.

Step S13: The complex simultaneous equations are solved.

Step S14: The signals obtained by transforming the phases of the input signals are generated.

Step S15: The linear sum of the input signals and signals obtained by transforming the phases of the input signals is found based on the solutions to the complex simultaneous equations.

Step S16: The operation of adding the results of the linear sums of the input signals is performed to obtain a signal free of aliasing.

Band Broadening Technique Using Shift in Two-Dimensional Direction

Below, an explanation will be made of the technique for broadening the band of the digital signal by using a plurality of discrete signals with sampling positions shifted in the two-dimensional direction.

Below, definitions will be given of the variables:

S: Total number of input digital signals (discrete signals)

L: Indexes 0,1 . . . , S−1 of digital signals $Y\_org_L$: L-th digital signal (frequency domain expression)

$y\_org_L$: L-th digital signal (space domain expression)

$Y_L$: L-th digital signal shifted in space (frequency domain expression)

$y_L$: L-th digital signal shifted in space (space domain expression)

$\alpha_{xL}$: Sampling phase difference (rad) of L-th digital signal with respect to 0-th signal in x-axial direction $\alpha_{yL}$: Sampling phase difference (rad) of L-th digital signal with respect to 0-th signal in y-axial direction $X_{i,k}$: i-th imaging component X in x-direction and k-th in y-direction ($\omega_{x-i} \cdot \omega_{Sx}, \omega_{y-i} \cdot \omega_{Sy}$), when i=k=0, the basic spectral component $P_x$: Number of imaging components with negative orders in x-direction $Q_x$: Number of imaging components with positive orders in x-direction $P_y$: Number of imaging components with negative orders in y-direction $Q_y$: Number of imaging components with positive orders in y-direction $N_x$: Multiple indicating how many multiples of components with respect to the Nyquist frequency the input continuous signal before sampling contains in x-direction $M_x$: Multiple indicating how many multiples of frequency components with respect to the Nyquist frequency are to be reconstructed in x-direction, usually $N_x = M_x$ $N_y$: Multiple indicating how many multiples of components with respect to the Nyquist frequency the input continuous signal before sampling contains in y-direction $M_y$: Multiple indicating how many multiples of frequency components with respect to the Nyquist frequency are to be reconstructed in y-direction, usually $N_y=M_y$ $w_L$: Complex number to be multiplied with the L-th digital signal in the frequency domain The basic concept is the same as the technique for broadening the band of a digital signal using discrete signals with sampling positions shifted in only a one-dimensional direction.

Figure 11A:
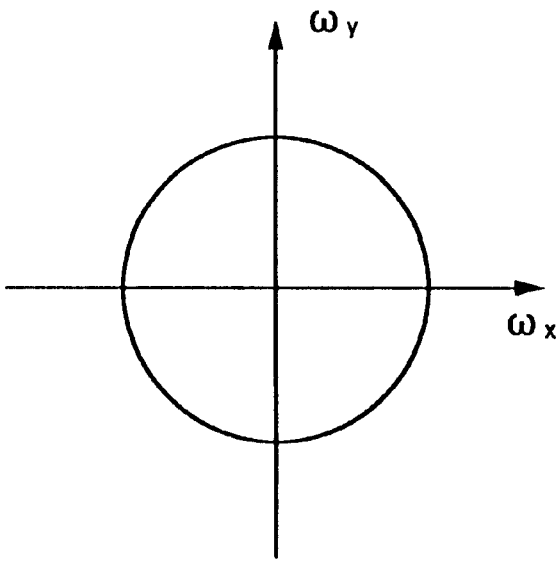
FIGS. 11A and 11B are views for explaining the basic spectrum component and the imaging component when the sampling position is shifted in the two-dimensional direction.
Figure 11B:
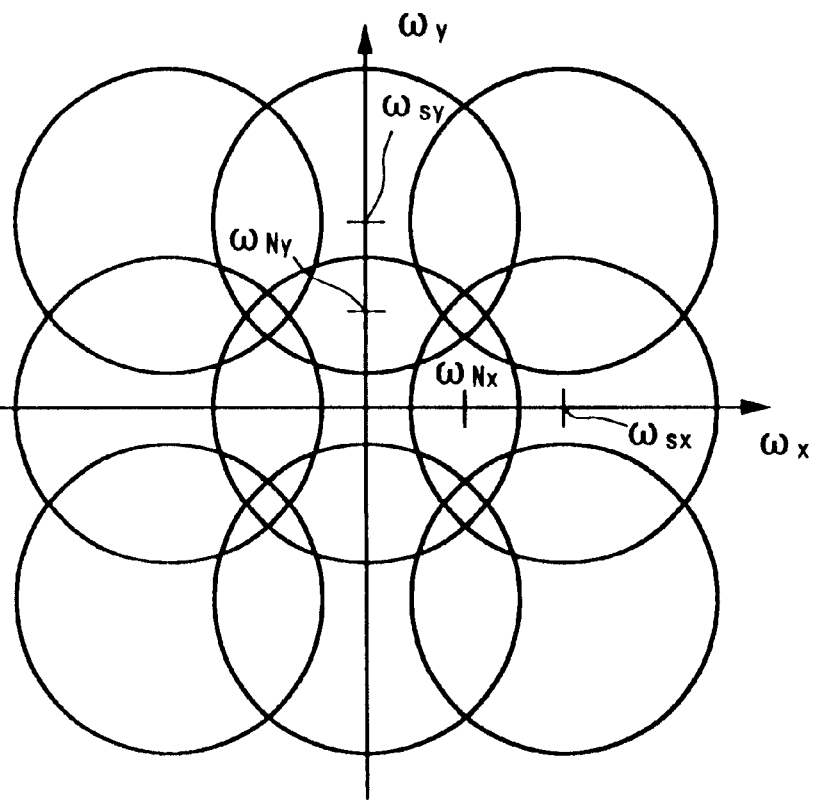

Note that where the sampling positions are shifted in two-dimensional directions, the basic spectral component and the imaging components resulting from the sampling two-dimensionally appear as shown in FIGS. 11A and 11B.

In FIG. 11B, the parts where the circles overlap each other are the aliasing.

The aliasing is canceled by multiplying with a plurality of discrete signals spatially shifted two-dimensionally the complex numbers obtained as the solutions of the complex simultaneous primary equations and adding the results of the multiplication operations.

Further, where the sampling positions are shifted in two-dimensional directions, the signal shifted in the sampling phase with respect to a reference discrete signal by exactly $\alpha_x$ in the x-direction and by $\alpha_y$ in the y-direction is indicated by the following equation (12) is shown by the following equation (13) when the reference discrete signal is shown by the following equation (12).

$$Y(\omega_x, \omega_y) = \sum_{i=-\infty}^{\infty} \sum_{k=-\infty}^{\infty} X(\omega_x - i\omega_{sx}, \omega_y - k\omega_{sy}) \qquad (12)$$

$$Y(\omega_x, \omega_y) = \exp(j \cdot (\omega_x a_x + \omega_y \alpha_y)/(2\pi)) \cdot \qquad (13)$$
$$\sum_{i=-\infty}^{\infty} \sum_{k=-\infty}^{\infty} \exp(-j \cdot (i\alpha_x + k\alpha_y)) X(\omega_x - i\omega_{sx}, \omega_y - k\omega_{sy})$$

Here, the two-dimensional spatial shift processing, if the space domain, is the shift to the proper position after interpolation similar to the case of the one dimension mentioned above.

Further, if the frequency domain, "$\exp(-j(\omega_x \cdot \alpha_x + \omega_y \cdot \alpha_y)/(2\Pi))$" may be multiplied with.

Next, the complex simultaneous equations for obtaining the complex number $w_L$ to be multiplied with the S number of discrete signals for reproducing the basic spectral component will be considered.

In the case of one dimension, as mentioned before, the number of the imaging components entering the frequency band in which the basic spectral component desires to be reproduced was (P+Q+1).

At this time, from the nature of a Fourier transform, by utilizing the fact that the spectra become symmetrical between positive and negative frequencies, only the positive frequency was considered and the number of the imaging components entering into the positive band was considered.

Contrary to this, in the case of two dimensions, from the nature of a Fourier transform, conjugation is achieved when centered about the origin, but not when centered about the $\omega_x$ axis or the $\omega_y$ axis. That is, in an $\omega_x$-$\omega_y$ plane, the first quadrant and third quadrant are conjugate, and the second quadrant and fourth quadrant are conjugate. Namely, two adjoining quadrants, for example, the first quadrant and second quadrant, are independent from each other. Accordingly, it is necessary to consider imaging components entering two quadrants, for example, the first quadrant and second quadrant. Note that the remaining two quadrants can be found by using the conjugate relationship.

For this reason, the first quadrant and the second quadrant will be considered. First, the first quadrant will be considered. The number S of the discrete signals necessary for obtaining the solution of the complex simultaneous equations for this first quadrant is the product of the discrete signals required in the x-direction and the discrete signals required In the y-direction and is expressed as:

$$S=(P_x+Q_x+1) \cdot (P_y+Q_y+1)$$

where, $P_x$=FLoor$((N_x-1)/2)$ $Q_x$=FLoor$((N_x+M_x-1)/2)$ $P_y$=FLoor$((N_y-1)/2)$ $Q_y$=FLoor$((N_y+M_y-1)/2)$ Note that, in the present embodiment, S becomes 4 when $N_y$ and $M_y$ are 2. If f our continuous signals are obtained, signals up to the twice of the Nyquist frequency can be obtained by eliminating the imaging components. Contrary to this, in the technique of the related art, nine continuous signals become necessary for obtaining the same signal.

Accordingly, the complex simultaneous equations become as shown in the following equation (14) where the number of the equations and the unknown number of the spectral component $X_{0,0}$ and the imaging components $X_{i,k}$ are S and the discrete signals of the first and third quadrants after the spatial shift are $Y13_L$. By solving the following equation (14) and finding the complex number $w_L$, the basic spectral component $X13_{0,0}$ of the first and third quadrants is found as shown in the following equation (15). Note that the $w_L$ of equation (15) indicates a complex number.

$$Y13_L = \sum_{i=-P_x}^{Q_x} \sum_{k=-P_y}^{Q_y} \exp(-j \cdot (i\alpha_{xL} + k\alpha_{yL})) X_{ik} \qquad (14)$$

where, L=0, 1, . . . , S-1

$$X13_{0,0} = \sum_{i=0}^{S-1} w_L Y13_L \qquad (15)$$

Next, when considering the second quadrant, in the second quadrant, $\omega_x$ is negative, and the imaging components in the x-direction become negative orders. Accordingly, the complex simultaneous equations become as shown in the following equation (16) where the number of equations and the unknown number of the basic spectral component $X_{0,0}$ and imaging components $X_{i,k}$ is S and the discrete signals of the second and fourth quadrants after the spatial shift is $Y24_L$. By solving the following equation (16) to find the complex number $W_L'$, the basic spectral component $X24_{0,0}$ is found as shown in the following equation (17). Note that $W_L'$ of the following equation (17) indicates a complex number different from $w_L$.

$$Y24_L = \sum_{i=-Q_x}^{P_x} \sum_{k=-P_y}^{Q_y} \exp(-j \cdot (i\alpha_{xL} + k\alpha_{yL}))X_{ik} \quad (16)$$

where, L=0, 1, . . . , S−1

$$X24_{0,0} = \sum_{i=0}^{S-1} w'_L Y24_L \quad (17)$$

The complex number $w_L$ obtained as described above is used for eliminating the imaging components of the first quadrant and the third quadrant, while the complex number $w_L'$ is used for eliminating the imaging components of the second quadrant and the fourth quadrant.

Here, the processing of the imaging components in the first quadrant and the third quadrant and the processing of the imaging components in the second quadrant and the fourth quadrant are independent, so the signal is divided into two.

The processing for dividing the signal into two, in the frequency domain, is for generating a signal replacing the values of the second quadrant and the fourth quadrant by 0 and a signal replacing the values of the first quadrant and the third quadrant by 0. On the other hand, in the space domain, it is for generating a signal after filtering for extracting the frequency components of the second quadrant and the fourth quadrant and a signal after filtering for extracting the frequency components of the first quadrant and the third quadrant.

Then, if the complex numbers $w_L$ and $w_L'$ are multiplied with these two signals in the same way as the case of the one dimension mentioned above, the basic spectrum $X13_L$ of the first and third quadrants after the elimination of the imaging components and the basic spectrum $X^{24}_L$ of the second and fourth quadrants after the elimination of the imaging components are obtained.

Then, finally, if the basic spectrum $X13_L$ and the basic spectrum $X24_L$ after the elimination of the imaging components are added, the intended band broadened signal is obtained.

Third Embodiment

In the present embodiment, an explanation will be made of an image system using the technique of broadening the band of a digital signal by using a plurality of discrete signals with sampling positions shifted in two-dimensional directions mentioned above.

Figure 12:
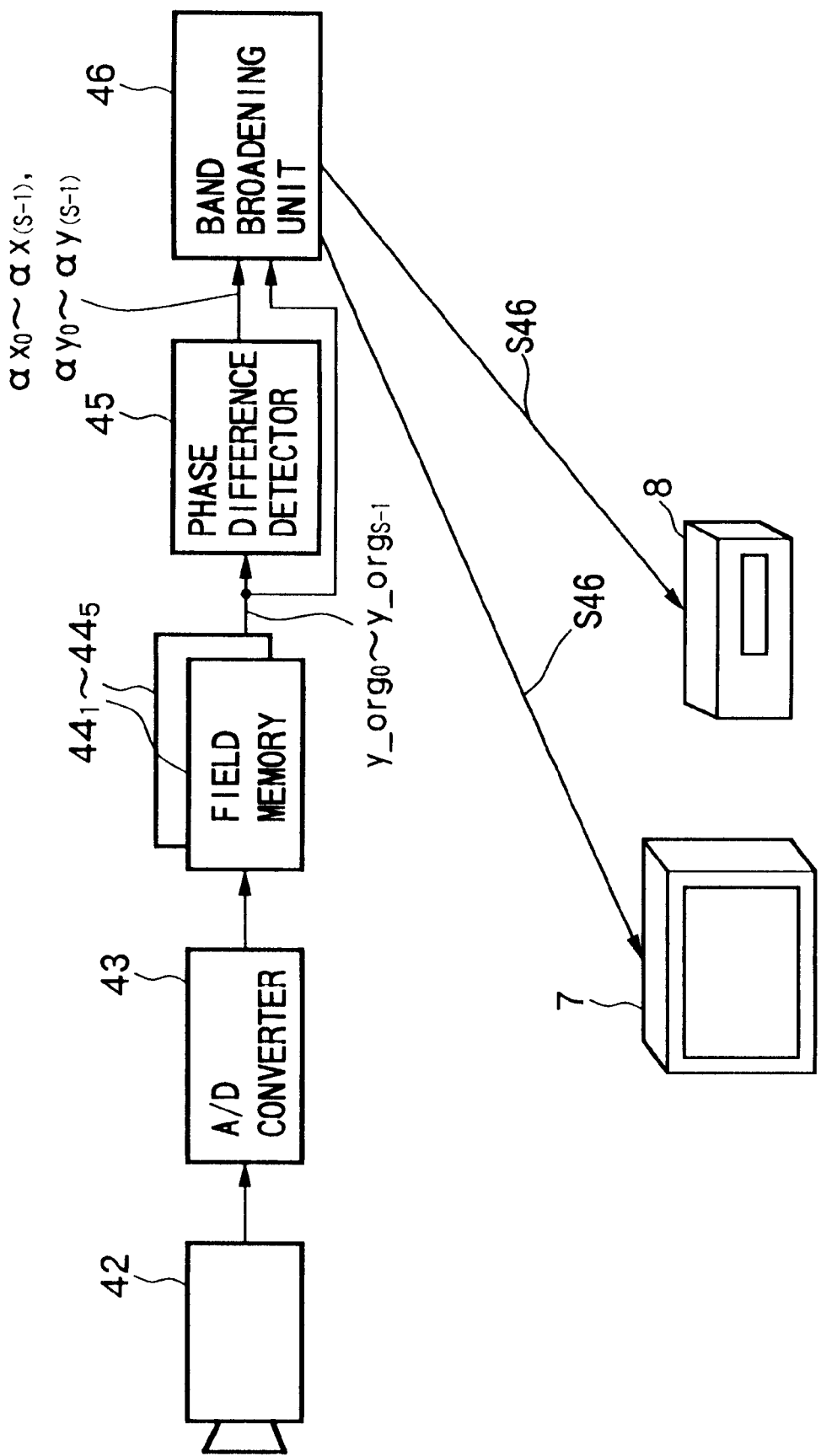
FIG. 12 is a view of the configuration of an image system according to a third embodiment of the present invention.

FIG. 12 is a view of the configuration of the image system 41 of the present embodiment.

As shown in FIG. 12, the image system 41 has a CCD camera 42, an A/D converter 43, field memories $44_0$ to $44_{S-1}$, a phase difference detector 45, and a band broadening unit 46, a display 7, and a printer 8.

The CCD camera 42 outputs a plurality of continuously obtained stationary images as the camera signal S2 to the A/D converter 43 while moving in the horizontal and vertical directions.

The A/D converter 43 samples the stationary image signals contained in the camera signal S42, converts them to a digital signal, and outputs the digital signal S43 to the field memories $44_0$ to $44_{S-1}$.

At this time, assume that frequency bands up to $N_x$ times and $N_y$ times the Nyquist frequency of the sampling in the A/D converter 3 in the x-direction and the y-direction are contained in the camera signal S42.

Further, the A/D converter 43 individually converts the stationary image signals of the S number of stationary images contained in the camera signal S42 from an analog to digital format to obtain S number of digital signals containing the aliasing and stores them in the field memories $44_0$ to $44_{S-1}$.

Note that, in the present embodiment, the sampling positions of the S number of digital signals are shifted from each other in the x-direction and the y-direction.

The field memories $44_0$ to $44_{S-1}$ store S number of digital signals y_org$_0$ to y_org$_{S-1}$ obtained from S number of stationary images.

The phase difference detector 45 detects the phase differences $\alpha_{x0}$ to $\alpha_{x(S-1)}$ in the x-direction and phase differences $\alpha_{y0}$ to $\alpha_{y(S-1)}$ in the y-direction of the digital signals y_org$_0$ to y_org$_{S-1}$ with respect to the digital signal y_org$_0$ read from the field memory $44_0$ based on the reference digital signal y_org$_0$ using for example the gradient method or the block matching method and outputs the result to the band broadening unit 6.

The band broadening unit 6 eliminates the aliasing due to the high order imaging components by using the digital signals y_org$_0$ to y_org$_{S-1}$ input from the field memories $44_0$ to $44_{S-1}$ and the phase differences $\alpha_{x0}$ to $\alpha_{x(S-1)}$ and $\alpha_{y0}$ to $\alpha_{y(S-1)}$ input from the phase difference detector 45 to generate the digital signal S46 having a high resolution.

Figure 13:
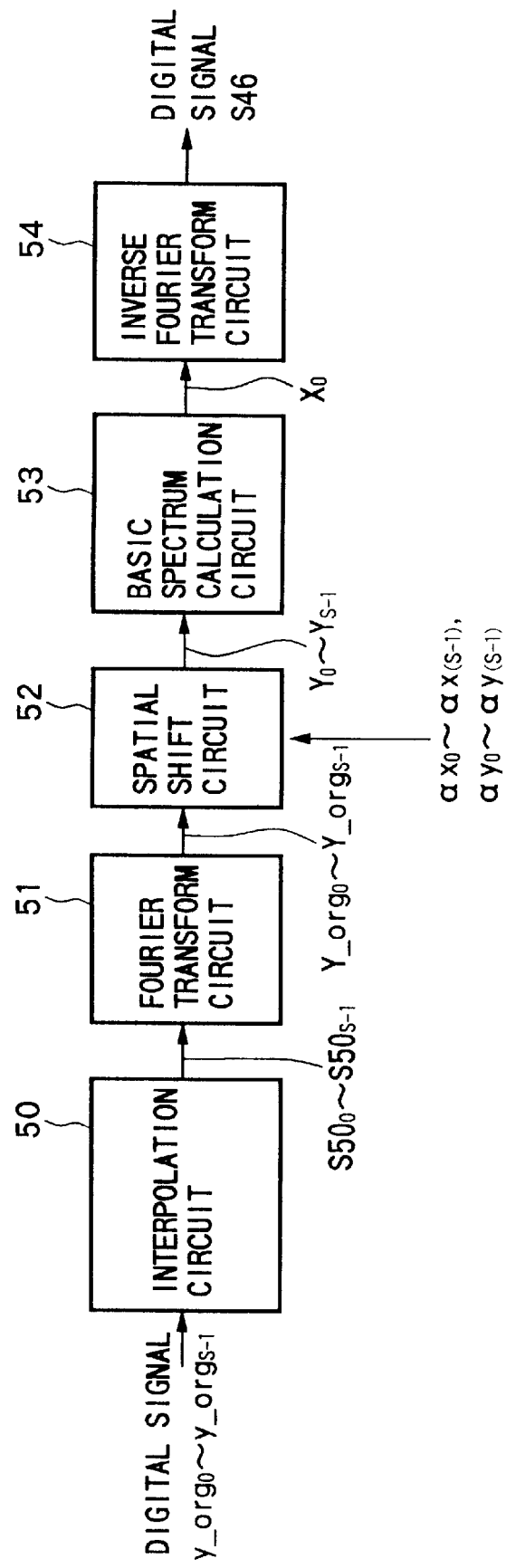
FIG. 13 is a view of the configuration of the band broadening unit shown in FIG. 10.

FIG. 13 is a view of the configuration of the band broadening unit 46.

As shown in FIG. 13, the band broadening unit 46 has an interpolation circuit 50, a Fourier transform circuit 51 (orthogonal transform circuit), a spatial shift circuit 52 (phase shift circuit), a basic spectrum calculation circuit 53 (complex number calculation circuit and signal calculation circuit), and an inverse Fourier transform circuit 54.

Figure 14:
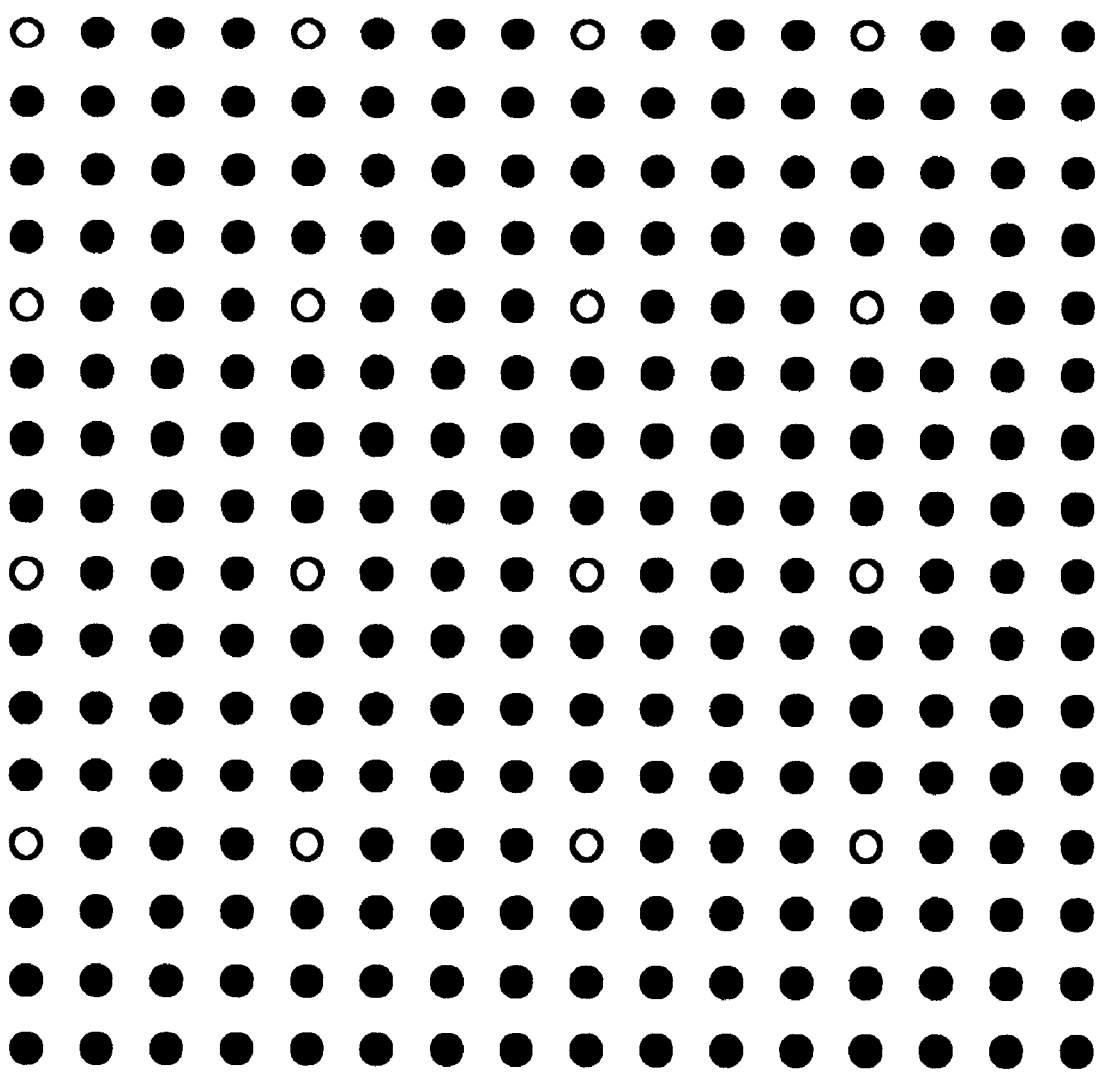
FIG. 14 is a view for explaining the processing of the Interpolation circuit shown in FIG. 11.
Figures 18A, 18B, 18C:
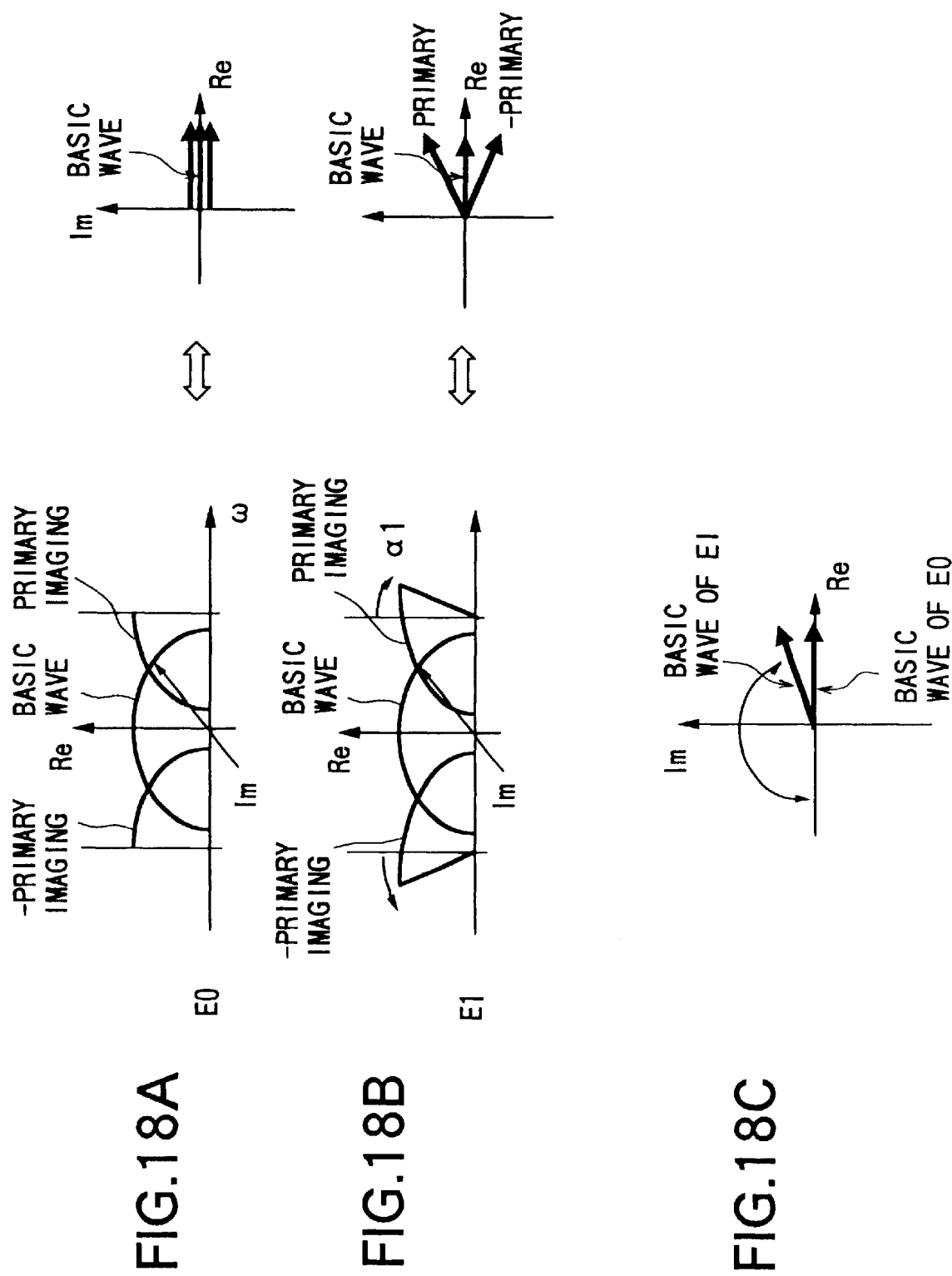
FIGS. 18A to 18C are views for explaining a phase shift method of the related art.

The interpolation circuit 50 inserts ($M_x$−1) number of zeros between the sampling positions in the x-direction for each of the digital signals y_org$_0$ to y_org$_{S-1}$ input from the field memories $54_1$ to $54_S$ to generate digital signals S50$_0$ to S50$_{S-1}$ and outputs the result to the Fourier transform circuit 51 as shown in FIG. 14.

Note that FIG. 14 shows an example where $M_x$=$M_y$=4, in which the white circles indicate actually sampled parts and the black circles indicate interpolated parts.

The Fourier transform circuit 51 outputs Y_org$_L$ to Y_org$_{S-1}$ in the frequency domain expression obtained by two-dimensional Fourier transform of the digital signals S50$_0$ to S50$_{S-1}$ input from the interpolation circuit 50 to the spatial shift circuit 52.

The spatial shift circuit 52 two-dimensionally spatially shifts Y_org$_L$ to Y_org$_{S-1}$ input from the Fourier transform circuit 51 to generate $Y_0$ to $Y_{S-1}$.

Namely, $\exp(-j(\omega_x\alpha_{x0}+\omega_y\alpha_{y0})/(2\Pi))$ to $\exp(-j(\omega_x\alpha_{x(S-1)}+\omega_y\alpha_{y(S-1)})/(2\Pi))$ are multiplied with Y_org$_L$ to Y_org$_{S-1}$.

Note that in this case, the portions above the Nyquist frequency in both of the x-direction and the y-direction indicate negative frequencies. For these portions, $\omega_x$ or $\omega_y$ must be changed to $(\omega_x\omega_{Sx}(\omega_x\omega_{Sx}))$ or $(\omega_y\omega_{Sy})$.

The basic spectrum calculation circuit 53 generates the complex numbers $w_0$ to $w_{S-1}$ indicated by equation (15) by solving equation (14), the complex simultaneous equations for the first quadrant, where $X_{i,K}$ is a variable and $Y_l$ and $\exp(-j(i\alpha_{x1}+k\alpha_{y1}))$ are constants.

Further, the basic spectrum calculation circuit 53 similarly generates the complex numbers $w_0'$ to $w_{S-1}'$ indicated by equation (17) by solving equation (16), the complex simultaneous equations for the second quadrant.

Further, the basic spectrum calculation circuit 53 divides each of $Y_0$ to $Y_{S-1}$ input from the spatial shift circuit 52 to the first quadrant and third quadrant and the second quadrant and fourth quadrant.

Specifically, the values of the frequencies of "$\omega_x > M_x \cdot \omega_{Nx}$ and $\omega_y \leq M_y \cdot \omega_{Ny}$" and "$\omega_x \leq M_x \cdot \omega_{Nx}$ and $\omega_y > M_y \cdot \omega_{Ny}$" are made 0 with respect to $Y_0$ to $Y_{S-1}$ to generate the signals $Y13_0$ to $Y{-}_{S-1}$ of the first quadrant and the third quadrant.

Further, the values of the frequencies of "$\omega_x \leq M_x \cdot \omega_{Nx}$ and $\omega_y \leq M_y \cdot \omega_{Ny}$" and "$\omega_x > M_x \cdot \omega_{Nx}$ and $\omega_y > M_y \cdot \omega_{Ny}$" are made 0 with respect to $Y_0$ to $Y_{S-1}$ to generate the signals $Y24_0$ to $Y24_{S-1}$ of the second quadrant and the fourth quadrant.

The basic spectrum calculation circuit 53 multiplies with $Y13_0$ to $Y13_{S-1}$ the complex numbers $w_0$ to $w_{S-1}$ to calculate the two-dimensional basic spectrum $X13_{0,0}$, multiplies with $Y24_0$ to $Y24_{S-1}$ the complex numbers $w_0'$ to $w_{S-1}'$ to calculate the two-dimensional basic spectrum $X24_{0,0}$ and adds the results to find the two-dimensional basic spectral component $X_{0,0}$ and outputs this to the inverse Fourier transform circuit 54. Note that, also in this case, the conjugate relationship is preserved. Namely, for $w_y > M\omega_{Ny}$, the conjugated value is multiplied at the multiplication or the conjugated value is found for the final result. By this, the basic spectral component $X_{0,0}$ is obtained.

The inverse Fourier transform circuit 54 applies inverse Fourier transform to the basic spectral component $X_{0,0}$ input from the basic spectrum calculation circuit 53 to obtain the band broadened digital signal S46.

Next, an explanation will be given of the function of the band broadening unit 46.

First, the interpolation circuit 50 inserts ($M_x-1$) number of zeros between the sampling positions in the x-direction and ($M_y-1$) zeros between the sampling positions in the y-direction for each of the digital signals y_org$_0$ to y_org$_{S-1}$ input from the field memories $54_1$ to $54s$ to generate the digital signals $S50_0$ to $S50_{S-1}$.

Next, the digital signals $S50_0$ to $S50_{S-1}$ are two-dimensionally Fourier transformed at the Fourier transform circuit 51, and the Y_org$_0$ to Y_org$_{S-1}$ in the frequency domain expression obtained by this are output to the spatial shift circuit 52.

Next, the spatial shift circuit 52 performs a two-dimensional spatial shift with respect to the Y_org$_0$ to Y_org$_{S-1}$ to generate $Y_0$ to $Y_{S-1}$.

Next, the basic spectrum calculation circuit 53 solves equation (14), the complex simultaneous equations for the first quadrant, to generate the complex numbers $w_0$ to $w_{S-1}$.

Further, the basic spectrum calculation circuit 53 solves equation (16), the complex simultaneous equations for the second quadrant, to generate the complex numbers $w_0'$ to $w_{S-1}'$.

Further, the basic spectrum calculation circuit 53 divides the input $Y_0$ to $Y_{S-1}$ to the first quadrant and third quadrant and the second quadrant and fourth quadrant to generate the signals $Y13_0$ to $Y13_{S-1}$ of the first quadrant and the third quadrant and the signals $Y24_0$ to $Y24_{S-1}$ of the second quadrant and the fourth quadrant.

Next, the basic spectrum calculation circuit 53 multiplies with $Y13_0$ to $Y13_{S-1}$ the complex numbers $w_0$ to $w_{S-1}$ multiplies with $Y24_0$ to $Y24_{S-1}$ the complex numbers $w_0'$ to $w_{S-1}'$, and adds these multiplication results to find the two-dimensional basic spectral component $X_{0,0}$.

Next, the inverse Fourier transform circuit 54 performs an inverse Fourier transform on the two-dimensional basic spectral component $X_{0,0}$ to obtain the band broadened globalized digital signal S46.

As explained above, according to the image system 41, S number of digital signals y_org$_0$ to y_org$_{S-1}$ are obtained from the camera signal S2 of the CCD camera 42, the phase differences $\alpha_{x0}$ to $\alpha_{x(S-1)}$ and $\alpha_{y0}$ to $\alpha_{y(S-1)}$ are obtained in the spatial shift circuit 42, and the above processing is carried out in the band broadening unit 46 shown in FIG. 11, whereby it is possible to use a smaller number of digital signals than in the related art to eliminate the imaging components which become a cause of aliasing and reproduce a signal of a frequency band of $M_x$ times and $M_y$ times the Nyquist frequency $\omega_N$ in the x-direction and the y-direction.

The flowchart in FIG. 8 is applied to the present embodiment.

Fourth Embodiment

In the third embodiment, as shown in FIG. 13, the case where the two-dimensional spatial shift and the calculation of the two-dimensional basic spectrum are carried out in the frequency domain was exemplified, but in the present embodiment, an explanation will be made of the case where these processings are carried out in the space domain (time domain).

The image system of the present embodiment is the same as the image system 41 of the third embodiment except for the configuration of the band broadening unit shown in FIG. 12 and FIG. 13.

Below, an explanation will be made of the band broadening unit of the image system of the present embodiment.

FIG. 15 is a view of the configuration of the band broadening unit 66 of the present embodiment.

As shown in FIG. 15, the band broadening unit 66 has an interpolation circuit 70, a spatial shift circuit 71 (phase shift circuit), and a broadband signal generation circuit 72 (complex number calculation circuit and signal calculation circuit).

The interpolation circuit 20 performs interpolation between the sampling positions in the x-direction and the y-direction of the digital signals y_org$_0$ to y_org$_{S-1}$ input from the phase difference detector 5 shown in FIG. 5 to generate the digital signals $S70_0$ to $S70_{S-1}$.

The spatial shift circuit 71 shifts the digital signals $S70_0$ to $S70_{S-1}$ input from the interpolation circuit 70 in the x-direction and the y-direction by exactly the amount of the phase difference with the digital signal $S70_0$ to generate the signals $y_0$ to $Y_{S-1}$.

Specifically, it eliminates a few samples at the head of the digital signals $S70_0$ to $S70_{S-1}$ having the increased sample number or adds a few samples of appropriate values to the head to generate the signals $y_0$ to $y_{S-1}$.

Since the complex simultaneous equations corresponding to equation (14) and the complex simultaneous equations corresponding to equation (16) are obtained by using the signals $y_0$ to $y_{S-1}$ input from the spatial shift circuit 71, the broadband signal generation circuit 72 solves them to find the complex numbers $w_L$ and $w_L'$.

Then, the broadband signal generation circuit 72 divides the signals $y_0$ to $y_{S-1}$ into components in which both x and y have positive frequencies and components in which x and y are opposite in sign. Namely, two-dimensional filtering for taking out frequencies in which both x and y are positive and two-dimensional filtering for taking out frequencies in which x and y are opposite in sign are applied. The signals obtained by them are defined as $y13_L$ and $y24_L$.

Then, the broadband signal generation circuit 72 applies a two-dimensional Hilbert transform to the signals $y13_L$ and $y24_L$. Namely, it shifts the phase by $\Pi/2$ (rad) and defines the signals obtained by them as $Y13_L'$ and $y24_L'$.

Then, the broadband signal generation circuit 72 finds $w_L \cdot y13_L$ for $y13_L$. Namely, it finds $Re(w_L) \cdot y13_L + Im(w_L) \cdot y13_L'$. Further, similarly, it finds $w'_L \cdot y24_L$ for $y24_L$. Namely, it finds $Re(w'_L) \cdot y24^{L+} Im(w'_L) \cdot y24_L'$.

Further, the broadband signal generation circuit 72 adds $w_L' \cdot y13_L$ and $W'_L \cdot y24_L$ to obtain the digital signal S76 in which the aliasing up to the M-th order is canceled and broadened in band.

The flowchart in FIG. 10 is applied to the present embodiment.

The present invention is not limited to the above embodiments.

For example, in the above processing, the order of processing is not limited to the order explained above.

Further, the order described above was given for simplification of explanation, but there also exists processing which becomes redundant and can be made unnecessary by changing the order.

Further, it is also possible to make the processing more efficient by computing the input signal in advance as in the third embodiment (FIG. 15) of Japanese Unexamined Patent Publication (Kokai) No. 7-245592.

Further, it is also possible to replace the frequency processing and the spatial processing with modular units.

Further, if using the characteristics of the input digital signals to reduce the original high frequency component and reduce the high order aliasing, it is possible to perform the processing by assuming the M-th order (N>M) even when there is up to N-th aliasing. In this case, there is a slight error, but there are the merits that the processing becomes lighter and the number of input digital signals can be reduced.

Further, the present invention is not limited to signals up to two dimension and can be applied also to n-dimensional signals.

Summarizing the effects of the invention, as explained above, according to the signal processing method of the present invention, it becomes possible to use a small number of signals to eliminate up to the high order imaging components and obtain the band broadened signal.

What is claimed is:

1. A signal processing method for removing from a plurality of discrete signals, obtained by sampling an identical or substantially identical continuous signal using sampling phases differing in one-dimensional or two-dimensional directions and including a basic spectral component and imaging components other than the basic spectral component included in the continuous signal, the imaging components and generating a signal in accordance with the basic spectral component, comprising the steps of:
   inputting the plurality of discrete signals including aliasing and differing in sampling phases and the value of the sampling phase difference,
   generating complex simultaneous equations having the basic spectral component and imaging components as variables, having an amount determined by the phase difference as a coefficient of the imaging components, and having the frequency domain expression of the input signal as a constant,
   solving the complex simultaneous equations, transforming the input signals to the frequency domain,
   multiplying complex numbers with the frequency domain expressions of the input signals based on the solutions to the complex simultaneous equations, and
   adding the results of the multiplication of the complex numbers with the frequency domain expressions of the input signals so as to obtain a signal free of aliasing.

2. A signal processing method as set forth in claim 1, wherein the sampling phase difference is one-dimensional.

3. A signal processing method as set forth in claim 1, where the signals and the sampling phase difference are two-dimensional, further including the steps of:
   dividing said input signals into a region where both x and y are positive frequencies and a region where x and y are opposite in sign,
   generating simultaneous equations for these divided regions, solving the generated simultaneous equations, multiplying complex numbers with the frequency domain expressions of the input signals based on the solutions of the simultaneous equations, and adding the results of multiplication of the complex numbers with the frequency domain expressions of the input signals, and
   adding the results of addition of the regions where both x and y are positive frequencies and the results of addition of the regions where x and y are opposite in sign to obtain a signal free of aliasing.

4. A signal processing method for removing from a plurality of discrete signals, obtained by sampling an identical or substantially identical continuous signal using sampling phases differing in one-dimensional or two-dimensional directions and including a basic spectral component and imaging components other than the basic spectral component included in the continuous signal, the imaging components and generating a signal in accordance with the basic spectral component, including the steps of:
   inputting the plurality of discrete signals including aliasing and differing in sampling phases and the value of the sampling phase difference,
   generating complex simultaneous equations having the basic spectral component and imaging components as variables, having an amount determined by the phase difference as a coefficient of the imaging components, and having the frequency domain expression of the input signal as a constant,
   solving the complex simultaneous equations, generating signals obtained by transforming the phases of the input signals,
   finding the linear sum of the input signals and signals obtained by transforming the phases of the input signals based on the solutions to the complex simultaneous equations, and
   adding the results of the linear sums of the input signals to obtain a signal free of aliasing.

5. A signal processing method as set forth in claim 4, wherein the sampling phase difference is one-dimensional.

6. A signal processing method as set forth in claim 4, where the signals and the sampling phase difference are two-dimensional, further including the steps of:
   dividing said input signals into a region where both x and y are positive frequencies and a region where x and y are opposite in sign,
   generating signals obtained by transforming the phases of the signals of the divided regions of the input signals,
   generating simultaneous equations for the divided regions, solving the generated simultaneous equations, and finding the linear sum of the input signals and the signals obtained by transforming the phases of the input signals based on the solutions of the simultaneous equations, and
   adding the results of the linear sum of the regions where both x and y are positive frequencies and the results of the linear sum of the regions where x and y are opposite in sign to obtain a signal free of aliasing.

* * * * *